(12) United States Patent
Moussavian et al.

(10) Patent No.: US 8,966,064 B2
(45) Date of Patent: *Feb. 24, 2015

(54) AGREEMENT COMPLIANCE CONTROLLED ELECTRONIC DEVICE THROTTLE

(75) Inventors: Negeen Moussavian, Rancho Sante Fe, CA (US); Amir Moussavian, Rancho Sante Fe, CA (US); Ben Badiee, La Jolla, CA (US); Mark Lewis, San Diego, CA (US)

(73) Assignee: Parentsware, LLC, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,138

(22) Filed: Aug. 7, 2012

(65) Prior Publication Data

US 2014/0012978 A1    Jan. 9, 2014

Related U.S. Application Data

(60) Provisional application No. 61/669,541, filed on Jul. 9, 2012.

(51) Int. Cl.
 *G06F 15/173* (2006.01)
(52) U.S. Cl.
 USPC .......................................... 709/224; 709/229
(58) Field of Classification Search
 USPC ................................................. 709/224, 229
 See application file for complete search history.

(56) References Cited

U.S. PATENT DOCUMENTS 5,835,722 A  11/1998 Bradshaw et al.
5,949,415 A  9/1999 Lin et al.
5,987,506 A  11/1999 Carter et al.
6,023,507 A  2/2000 Wookey
6,070,190 A  5/2000 Reps et al.

(Continued)

FOREIGN PATENT DOCUMENTS

EP   1271352   1/2003
EP   2239679   10/2010

(Continued)

OTHER PUBLICATIONS

Karlsson, Magnus et al. Triag: Performance Isolation and Differentiation for Storgage Systems, Mar. 10, 2004, 24 pages.

(Continued)

*Primary Examiner* — Abdullahi Salad
(74) *Attorney, Agent, or Firm* — ARC IP Law, PC; Joseph J. Mayo

(57) ABSTRACT

Controls electronic devices and/or throttles electronic devices and/or information for electronic devices based on agreements or events or any combination thereof. An agreement includes one or more conditions to satisfy the agreement, such as one or more tasks or activities to be performed by an agreement performer or events that may be detected, and actions performed to enforce or assert the agreement such as controlling the electronic device and/or enabling or disabling or otherwise limiting, reducing or increasing the amount or type of information allowed with respect to any or all electronic devices associated with the agreement performer. For example, the system controls the electronic device and/or enables, disables or limits the amount or type of information on an electronic device, e.g., telephone, computer, game, television, vehicle based on whether the child has finished assigned homework, chores or extracurricular activities as specified as conditions of the agreement.

17 Claims, 14 Drawing Sheets

(56) References Cited

U.S. PATENT DOCUMENTS

| | | |
|---|---|---|
| 6,233,428 B1 | 5/2001 | Fryer |
| 6,446,119 B1 | 9/2002 | Olah et al. |
| 6,691,067 B1 | 2/2004 | Ding et al. |
| 6,721,688 B1 | 4/2004 | Clarke |
| 6,745,367 B1 | 6/2004 | Bates et al. |
| 6,754,664 B1 | 6/2004 | Bush |
| 6,889,169 B2 | 5/2005 | Kirshenbaum et al. |
| 6,904,168 B1 | 6/2005 | Steinberg et al. |
| 6,978,303 B1 | 12/2005 | McCreesh et al. |
| 7,103,215 B2 | 9/2006 | Buzuloiu et al. |
| 7,185,015 B2 | 2/2007 | Kester et al. |
| 7,206,845 B2 | 4/2007 | Banning et al. |
| 7,237,024 B2 | 6/2007 | Toomey |
| 7,290,278 B2 | 10/2007 | Cahill et al. |
| 7,383,333 B2 | 6/2008 | Philyaw et al. |
| 7,502,797 B2 | 3/2009 | Schran et al. |
| 7,577,739 B2 | 8/2009 | Donahue |
| 7,797,270 B2 | 9/2010 | Kester et al. |
| 7,814,542 B1 | 10/2010 | Day |
| 7,846,020 B2 | 12/2010 | Walker et al. |
| 7,870,189 B2 | 1/2011 | Philyaw et al. |
| 7,899,862 B2 | 3/2011 | Appelman et al. |
| 7,904,596 B1 | 3/2011 | Wang et al. |
| 7,925,780 B2 | 4/2011 | Philyaw et al. |
| 7,958,234 B2 | 6/2011 | Thomas et al. |
| 7,979,576 B2 | 7/2011 | Philyaw et al. |
| 8,010,037 B2 | 8/2011 | Bannwolf et al. |
| 8,015,174 B2 | 9/2011 | Hubbard |
| 8,020,209 B2 | 9/2011 | Kester et al. |
| 8,024,471 B2 | 9/2011 | Sinclair et al. |
| 8,046,250 B1 | 10/2011 | Cohen et al. |
| 8,078,724 B2 | 12/2011 | Wang et al. |
| 8,141,147 B2 | 3/2012 | Sinclair et al. |
| 8,150,817 B2 | 4/2012 | Kester et al. |
| 8,255,950 B1 | 8/2012 | Wick et al. |
| 8,281,037 B2 | 10/2012 | Julia et al. |
| 8,281,366 B1 | 10/2012 | McCorkendale et al. |
| 8,281,382 B1 | 10/2012 | Sanyal et al. |
| 8,285,249 B2 | 10/2012 | Baker et al. |
| 8,285,250 B2 | 10/2012 | Rubin et al. |
| 8,307,068 B2 | 11/2012 | Schuler |
| 2001/0056544 A1 | 12/2001 | Walker |
| 2003/0221118 A1 | 11/2003 | Walker |
| 2004/0158631 A1 | 8/2004 | Chang et al. |
| 2006/0025282 A1 | 2/2006 | Redmann |
| 2008/0080691 A1 | 4/2008 | Dolan et al. |
| 2009/0174566 A1 | 7/2009 | Volk et al. |
| 2010/0048272 A1 | 2/2010 | Koh |
| 2010/0318642 A1 | 12/2010 | Dozier |
| 2011/0078767 A1 | 3/2011 | Cai et al. |
| 2012/0215328 A1 | 8/2012 | Schmelzer |
| 2012/0237908 A1 | 9/2012 | Fitzgerald et al. |
| 2012/0239173 A1 | 9/2012 | Laikari et al. |
| 2012/0244879 A1 | 9/2012 | Freathy et al. |
| 2012/0250646 A1 | 10/2012 | Rubin et al. |

FOREIGN PATENT DOCUMENTS

| | | |
|---|---|---|
| RU | 2326439 | 6/2008 |
| WO | 0198936 | 12/2001 |
| WO | 0225415 | 3/2002 |
| WO | 2009059199 | 7/2009 |
| WO | 2010051455 | 6/2010 |
| WO | 2010102265 | 10/2010 |
| WO | 2011061412 | 5/2011 |

OTHER PUBLICATIONS

International Search Report issued for PCT/US2013/049813, dated Oct. 24, 2013, 7 pages.

International Search Report issued for PCT/US2013/049809, dated Oct. 31, 2013, 7 pages.

International Search Report issued for PCT/US2013/049806, dated Nov. 7, 2013, 7 pages.

AGREEMENT COMPLIANCE CONTROLLED ELECTRONIC DEVICE THROTTLE

This application claims the benefit of U.S. Provisional Patent Application 61/669,541 filed on 9 Jul. 2012, the specification of which is hereby incorporated herein by reference.

BACKGROUND OF THE INVENTION

1. Field of the Invention

One or more embodiments of the invention are related to the field of information monitoring, content filtering and content control of information for electronic devices and/or control of electronic devices or apparatus employing one or more electronic devices, as well as compliance management and event detection. Any electronic devices may be throttled including but not limited to telephones, computers, games, televisions, music players, vehicles, cars, motorcycles, remote controls for audio/visual components, household devices or any other stationary or moveable object. Embodiments are configured to throttle or in any manner limit, alter, decrease or increase the functionality of any electronic device/apparatus and/or throttle or in any manner limit, alter, decrease or increase information that is input to, output from, used on or exchanged with electronic devices based on compliance with "agreements". An agreement includes one or more conditions to satisfy the agreement, such as one or more tasks or activities to be performed by an agreement performer or events that may be encountered or monitored, and actions that are performed to enforce or assert the agreement with respect to any or all electronic devices associated with the agreement performer. For example, embodiments enable throttling of electronic devices or associated information based on whether an agreement performer such as a child has finished assigned homework, chores or extracurricular activities or events such as weather or health related for example or any combination thereof to redefine the experience of parenting. Other embodiments may be utilized for improved compliance and control of electronic devices in corporate or institutional settings or self-compliance single user settings.

2. Description of the Related Art

Electronics devices are ubiquitous and include telephones, computers, games, televisions, music players or any other electronic devices that are programmable, including but not limited to programmable controllers or computers within vehicles, cars, motorcycles, remote controls, household devices or any other stationary or moveable object. Many of these devices are being adopted and utilized for more diverse functions and at increasingly younger ages, especially information devices. Some electronic devices are considered to be "externally facing" because of their network capabilities that may include for example exchanging of information with external servers. These devices may include Internet access, WiFi capabilities, BLUETOOTH® or other wireless communications technologies, and generally have IP addresses, or other unique identifiers and/or GPS functions. Currently, electronic devices that historically have not had an external exchange of information with a communications network are gradually becoming network-enabled, for example part of the standard "home network". The home network includes television and/or cable set top boxes, computer printers capable of remote status reporting, air conditioning units with remote monitoring, and even appliances, including refrigerators with remote temperature setting capabilities.

There are no known systems that throttle electronic devices or throttle information to/from/on the electronic devices, based on compliance with agreements having conditions based on activities performed by an agreement performer or events such as external events or any combination thereof. Existing solutions related to Quality of Service (QoS) and Grade of Service (GoS) are related to providing priority to different users, and not providing an altered priority or service level for a particular user based on conditions of an agreement that include activities or events that may directly or indirectly affect a user. For example, QoS products attempt to preserve a particular data flow for a given user or application and are not capable of altering bandwidth or type of information accessed or altering the functionality of the device itself based on homework status, test grades, compliance with a corporate training requirements, or health related events such as heat, cold, pollen, smog or other events.

With respect to younger age groups, use of mobile electronic devices such as mobile phones, tablets, and portable computers is increasingly. For example, children are being given mobile devices at younger ages and/or Internet access. This has led to a new generation of technically knowledgeable children whose lives are centered on "networked" communication such as texting, mobile phone calls, use of applications on mobile devices, use of social networks/media, peer-to-peer video games, cloud-based video games, and general websites on the Internet. For this generation, the web has expanded to well beyond e-mail and e-commerce web sites, and has become a source of videos, game playing, social connection, news, applications, and a platform for sharing ideas, music, pictures, videos and various forms of multimedia.

This incredible paradigm shift has resulted in individuals of all ages spending an inordinate amount of time using electronic devices, and in turn becoming distracted by them, hindering productivity and adversely impacting time and organizational management systems and in general making people less engaging in person, less physically active and less healthy. Whether through phone calls, texting, use of apps, social networks, video games, and general websites, children in their most formative years, for example 5-12 years old and even younger and older children as well, are particularly at risk for distraction. This level of distraction leads to sub-par academic performance, incompletion or delayed completion of household chores, or other assigned activities, such as physical exercise, taking of medications, etc. There are no known systems that throttle electronic devices or throttle information to/from/on electronic devices associated with children based on their compliance with agreements or other events. For example, there are no known systems that increase or decrease web access to websites or limit mobile phone or text message usage or any combination thereof, or otherwise as described herein, based on compliance with an agreement, such as achieving a particular grade on homework or a test or an event such as temperature, allergy or smog events or any combination thereof.

In corporate settings, some employees are required to maintain competency in a particular area and are required to read or be tested, for example on safety or other job requirements. There are no known systems that throttle electronic devices or throttle information to/from/on electronic devices associated with employees based on their compliance with agreements or other events. There are no known systems that limit web access to work related websites or limit mobile phone or text message usage within a building or any combination thereof, or otherwise as described herein, based on compliance with an agreement, such as taking a required training test or an event such as a weather emergency or any combination thereof.

One method for controlling these devices and/or networks is to confiscate the devices, or deactivate Internet access. This is sometimes difficult to do or may cause safety issues by disabling ones ability to dial emergency telephone numbers for example. Other solutions to limit Internet access include use of proxy servers or web filtering software. Known proxy servers and web filtering software are basic content filters that filter information on computers based on a web address or the content at a website. In effect, these filters limit "what" a user may view or do. These types of filters generally block all information from a domain or website that contains content that meets some criteria, wherein the blocking is based entirely on the content itself and not any external criteria or conditions or events. In addition, some types of filters have time ranges for use that limit the times at which a user may view or do something. Phone based filtering is used for parental control to limit the number of texts or cell phone minutes that a child may use, or to alert a parent if a child is out of a defined area. Other solutions may disable texting if the mobile phone is moving, to prevent texting while driving, without regard to a portable computer such as a tablet or laptop that a child may have which may not block this behavior. Hence, known solutions are also standalone, configured on a per device basis and not across devices associated with a particular person.

Knowledgeable users may easily bypass some types of content filters. One such method for bypassing these types of filters includes using open and anonymous HTTPS transparent proxies for example. Thus, known filters cannot control email, instant messages or chat sessions in any sophisticated manner since these types of open proxies may be utilized to bypass any installed web filtering software.

Other solutions do not actually control the devices, but rather involve monitoring software that is highly invasive and intercepts or otherwise supervises electronic devices and copies keystrokes, screen images, text messages and any other input or output to the electronic device to a third party for surveillance purposes. This type of solution is used to monitor children, employees, in intelligence services and for remote home surveillance for example. There are negative limitations to this solution, privacy being a major problem area.

On the positive side of reinforcement, there are also point based incentive systems that attempt to positively reward a person for a type of behavior, for example by earning points. These types of systems are also standalone and do not tie into any electronics to limit usage in any intelligent manner for example for across multiple electronics devices associated with a person, such as a child or employee or institutionalized individual.

There are no known systems that control electronic devices, for example dim screens, activate sounds, introduce delays or throttle, decrease or increase the amount of or type of information to/from/on the electronic device based on compliance with an agreement or event or any combination thereof. This includes vehicles, such as a car, wherein there are no known solutions that set a maximum acceleration setting based on performance on homework or a grade obtained on an examination as part of an agreement for example or based on an event such as if a weather website indicates a chance of slippery road conditions or an accident local to an area where the automobile is currently travelling or any combination thereof.

There are no known systems that increase bandwidth or sources of information for an agreement performer if the agreement performer has walked, biked, run or swim or otherwise moved by their own effort over a predefined distance for health compliance. There are no known systems that throttle or increase bandwidth in case of high pollen count or smog alert events to encourage a child to stay inside and surf the web or play games, or decrease bandwidth or type of information if the weather is good outside to promote exercise such as physical game play instead of video game play. There are no known systems that throttle or limit or reduce bandwidth or sources of information based on the location of an electronic device if a child is currently grounded and increase the bandwidth in the location where the child is not grounded. There are no known systems that limit game playing capabilities or levels in games based on compliance with an agreement or event. There are no known systems that limit playlists, or particular songs or song types, e.g., with offensive lyrics, based on compliance with an agreement or event. There are no known systems that throttle a device based on activities associated with another user or a group of other users, i.e., friends of a child or work groups to encourage better circles of friends or improved group performance. This for example enables a parent to indirectly reward a child to encourage a child to associate with well-behaved children.

In addition, there are no known systems that data mine for rewards that may be utilized by a parent for a reward that is similar to a reward for a condition that another parent or person has utilized. There are no known systems that enable manufacturers to data mine for types of rewards or incentives and target a group of parents or persons that may buy certain types of products based on agreements and conditions. There are no known systems that enable parents or other persons to remain up to date on items popular amongst children that are based on agreements that other parents have entered and which have resulted in rewards for meeting conditions of the agreements. There are no known systems that displays potential rewards based on bandwidth usage based on information monitoring with respect to a condition of an agreement, to provide further incentive to perform a task for example. There are no known systems that provide popups or text messages during game play showing tasks to be completed according to agreements. There are no known systems that determine if a child is communicating with a known sex offender, for example based on sex offender maps and IP tracing, for example alert to a parent and potentially throttle other forms of electronic device utilization to further protect a child. There are no known systems that alert a parent when a child's friends have gotten in trouble or are not meeting their agreements, so that a parent may limit a child's interactions with particular people or groups. There are no known solutions that limit a person's agreement with himself or herself to throttle usage based on addictive behavior such as online gambling or obsessive pornography viewing. There are no known systems that data mine an agreement database having multiple parents and children to determine whether a parent is strict or not strict, or to rate how strict a parent is being with respect to other parents, agreements and conditions, or in any other manner rate what kind of parent a parent is based on how a child is performing and the rewards that a child is receiving for example. There are no known systems that provide tips or recommendations for example to improve a child's performance based on parent and/or child behavior with respect to agreements.

In summary, known solutions either intrusively monitor, or filter content entirely on a per device basis and do not throttle information based on conditions, or compliance with agreements or events, for example that are network detectable. Known solutions simply enable or disable the information entirely and on a per device basis without regard to the other devices associated with an agreement performer, such as a child, or employee or other user. For example, known solutions do not throttle an electronic device to limit or decrease or increase information input, output or exchanged with one or more electronic devices such as but not limited to a telephone, computer, game, television or music player or any other device having a computer or any combination thereof based on whether a student has finished assigned homework, chores or extracurricular activities, or whether an employee has complied with a work requirement.

For at least the limitations described above there is a need for an agreement compliance controlled electronic device throttle.

BRIEF SUMMARY OF THE INVENTION

One or more embodiments on the invention enable an agreement compliance controlled electronic device throttle. Embodiments may be utilized to throttle, or in any manner limit, alter, decrease or increase the functionality of electronic devices and/or throttle, or in any manner limit, alter, decrease or increase the information that is input to, output from, used on or exchanged with electronic devices based on compliance with an "agreement". An agreement includes one or more conditions to satisfy the agreement, such as one or more tasks or activities to be performed by an agreement performer or events that may be encountered or monitored, and actions that are performed to enforce or assert the agreement with respect to any or all electronic devices associated with the agreement performer. Any electronic devices may be throttled including but not limited to telephones, computers, games, televisions, music players, vehicles, cars, motorcycles, remote controls for audio/visual components, household devices or any other stationary or moveable object. For example, embodiments enable throttling of electronic devices or associated information based on whether an agreement performer such as a child has finished assigned homework, chores or extracurricular activities or events such as weather or health related for example or any combination thereof to redefine the experience of parenting. Other embodiments may be utilized for improved compliance and control of electronic devices in corporate or institutional settings or self-compliance single user settings.

Embodiments generally utilize or interface with an agreement database that includes an agreement that can be between two roles, which may be played by one or more humans, for example an agreement creator and an agreement performer. This may include parents and children or employers and employees or any other role between agreement creator and agreement performer. These roles may be taken by the same person, or by groups of people. One or more embodiments may be utilized to redefine the experience of parenting by making the system enforce agreements between parents and children, rather than the parent. Embodiments of the system foster a collaborative process with respect to goal setting and management. This enables electronic device usage dependent upon agreements between parents and children, e.g., throttling access to websites/apps/text messaging or total time of electronic device usage across all devices associated with a child based on completion of school, home or extracurricular activities, which is heretofore unknown in the art. Embodiments may be utilized in corporate or institutional settings as well for compliance with corporate requirements. The agreement may be implemented for example in an object oriented or relational database or any other type of data retaining apparatus. The agreement generally includes information related to an agreement performer, an agreement creator, a condition to be satisfied by the agreement performer, or an event that may or may not be related to the agreement performer and an action to be performed based on compliance with the condition by the agreement performer. In one or more embodiments of the invention, the agreements may include actions/limits that are performed or enforced before a condition is satisfied.

One type of condition may be based on an activity performed by the agreement performer. The system may utilize or interface with one or more activity database that contains activity status associated with the condition to be satisfied by the agreement performer. The activity database may be integrated with the agreement database or separate or distributed in any manner as desired. One form of activity database is a School Information System or SIS, which holds assignments, tests, grades, dates and other school related activities and associated status. The compliance and activity status may be based on trust, evidence or confirmation or any combination thereof.

Bandwidth or information type may be throttled down or up. For example if an employee has not completed a required corporate training session, their bandwidth or access to text messages or websites may be decreased for example. Alternatively, throttling of bandwidth or type of information may be increased, for example in the case of an event such as high pollen count or smog alert that the system detects or is otherwise made aware of. This encourages children or employees to remain inside to use electronic devices in case of hazardous outdoor conditions or alternatively encourages children or employees to locate outdoors in healthy conditions.

Another type of condition may be based on an event that may be discovered or otherwise determined by the system. In one or more embodiments, the system may also encounter, discover, obtain or in any other way utilize events to control the electronic device, for example set information parameters in the electronic device that alters the functionality of the electronic device. For example, one or more embodiments of the invention may set the maximum acceleration setting in a computer that controls a vehicle based on performance on homework or a grade obtained on an examination as part of an agreement, or based on an event such as a weather event that is discovered by the system when a weather website indicates a chance of slippery road conditions or an accident local to an area where the vehicle is currently travelling or any combination thereof. Embodiments of the invention may throttle information parameters up or in an any increasing fashion as well, wherein the acceleration setting in the computer on the vehicle may be increased to allow for more aggressive driving performance if the agreement performer has complied with an agreement or in case of emergency as determined by the system or in case of exiting an area where an accident has been passed.

Furthermore, the volume of a car radio or stations allowed, or a music player utilized whether or not moving in a vehicle, may be set based on the activities of the agreement performer, for example good grades or bad grades, or based on the weather events for example to set a station automatically to a weather or hazard channel if the weather event detected is of a particular nature. The combination of setting or throttling devices themselves or information associated therewith may be based on activity type conditions and event type conditions or any combination thereof, which is unknown in the art.

The system may utilize an agreement monitor coupled with the agreement database and the activity database that is configured to check if the condition has been satisfied based on the activity status to determine compliance. Alternatively or in combination the agreement monitor or any other element in the system may be configured to utilize the Internet or other network connection to discover events that may trigger conditions of agreements and assert actions. The agreement monitor may be implemented in a variety of configurations that may monitor agreements, activities, events or any other quantity wherein the agreement monitor may execute on any computing element within the system.

An information monitor may be utilized in many configurations wherein the information monitor is configured to determine monitored information associated with an electronic device that is associated with the agreement performer. Alternatively, or in combination, the information monitor may locally check conditions based on the monitored information to determine when a limit is reached. For example, if a certain number of text messages have been sent/received in a month, the system may limit or block access to all text based applications on all devices associated with a child by broadcasting the monitored information and/or limit event to the agreement server and/or other electronic devices associated with the agreement performer. By determining the monitored information, for example the application being utilized, the information being viewed, the amount of text messages input, etc., the system may throttle the amount or speed of that monitored information, or allow or block the information altogether based on compliance, as opposed to content. Embodiments of the invention may throttle information by throttling associated applications as well, by introducing delays and or dimmed screens, or asserting sounds or warnings or otherwise limiting the application, or disabling the application altogether.

In one or more embodiments, the system utilizes an information throttle coupled with the agreement monitor and optionally coupled with the information monitor, wherein the information throttle is configured to perform the action, based on the compliance with the condition by the agreement performer, or event associated with the condition. The information throttle may implement the action wherein the action is configured to control the electronic device itself, for example dim a screen, activate sounds, introduce delays and/or limit or throttle or decrease or increase the monitored information associated with one or more electronic device, for example slow or limit the number of text messages on a cell phone, display of web pages for any set of web sites, display a reminder on a television to finish homework if changed to a particular channel or program, or in any other manner limit, allow or block information. For example, embodiments may limit access to a website or disable an application, play an audio message during music playing, or in any other manner limit, allow or block any functionality of any electronic device associated with the agreement performer. Embodiments of the invention may perform in a non-standalone or integrated manner in order to disable all texting on all devices associated with a child if a text message is sent from a particular location, for example if "grounded", or while moving over a threshold speed indicative of driving. In one or more embodiments of the invention, if a text message is sent via a mobile computer or tablet and a cell phone associated with the child is moving over a certain speed, then the computer or tablet may block access by obtaining a speed event from the cell phone and determine that the child is attempting to bypass text throttling through use of a device other than a cell phone to send a text message.

In a parent/child embodiment, a parent may embody the agreement creator and may propose an agreement with a condition such as "IF all assigned homework is completed by 9 PM" and an action such as "enable social media websites for 1 hour at unlimited bandwidth across all electronic devices associated with an agreement performer, and 1 hour with 50% speed degradation up to 20 text messages". In this scenario, a child may embody the agreement performer, and may agree to the conditions in order to obtain access to information, including websites, videos and/or television shows, text messages, phone minutes, game time, music, etc. In this scenario, the condition is effectively an activity to be performed by the agreement performer. In other scenarios, the condition may be related to an activity performed by a third party, such as "if payment from third party received is greater than $50" then an action of "enable text messaging" for example on the mobile phone associated with the child, for example if the child has earned enough money from a job or chores. Conditions may also include time components in addition to an activity, for example when some activity is due. Alternatively, or in combination, the time component may include a time range, for example a time start and time stop. The time component may be in any format and include any temporal information including a day, date, recurring interval such as "every other Friday", or any other description related to time. One or more embodiments of the invention may show text or play audio reminders on electronic devices of upcoming deadlines, e.g., tests or homework or chores or piano lessons or any other activity with an associated deadline or due date. Embodiments of the invention may implement actions that throttle or limit monitored information in any manner. For example, actions may include a time limit that limits an amount of time that the monitored information may be utilized or displayed on the electronic device, or a total across all electronic devices associated with a particular agreement performer, a numerical limit that limits a number of data entries associated with the monitored information, a web limit that limits access to a website associated with the monitored information, an application limit that limits access to an application associated with the monitored information, a game limit that limits game parameters associated with the monitored information, a television limit that limits a television program or channel associated with the monitored information. Video and television are utilized herein as different delivery mechanisms for potentially the same time sequenced multi-picture media, whether delivered on a computer or television. Activities may originate from the electronic devices themselves and may include any output that each electronic device is capable of generating, such as the output results of character inputs, to determine if a child has read an entire chapter. Conditions, for example that specify event and values thereof or ranges may be utilized including but not limited to the orientation, location, speed or any other characteristic of any electronic device, along with a description of the application being used may then be utilized to assert an action, for example to limit text messaging if driving for example, even if the texting is occurring on a device other than the device that is capable of detecting speed. Events such as location-based events may be checked against agreements to find out whether to assert an action to control an electronic device or throttle information to/from/on the electronic device. For example, if a child is grounded, then bandwidth may be decreased or terminated outside of the grounded area and increased when the child is within the grounded area. In addition, events such as predefined distance events that occur if an agreement performer has moved themselves over an agreed upon distance and for example under the speed associated with a car may be utilized to throttle or increase the amount of bandwidth or type of data that the agreement performer may interact with or game playing levels may be increased or more aggressive games may be allowed or more weapons may be enabled within games or playlists with more energetic music may be enabled, etc.

One or more embodiments of the invention may interface with or otherwise utilize one or more activity databases that include activities related to schoolwork, chores or extracurricular activities or any combination thereof. For example, an activity database such as a school information system or SIS that includes homework activities and other assignments or tasks and associated activity status may be utilized. In addition, a parent may implement a similar system with chore related activities including "mow the lawn every other Saturday" with associated activity status of True or False for the current time period. The associated action may include "enable 20 extra phone minutes" or "enable TV program XYZ" or any other action including "transfer $20 to allowance money card" for the payment of an allowance for example. The activity status may include information related to completion of an activity assigned to the agreement performer in the form of Boolean True or False, or a range, which may be utilized a range of actions based on a condition of "grade A", "grade B", "grade C" conditions in a particular class or on a particular test or as a cumulative average across classes or any other combination thereof. This range of conditions may be utilized to provide a corresponding range of actions that correspond to the different grades, for example "provide unlimited web browsing", "degrade browsing speed by 20%", "send alert when electronic device is greater than 0.25 miles from home", to implement a "grounding" of the child respectively.

Non-time oriented conditions or events may also be implemented, for example if a speed of an electronic device is indicative of driving, an action such as limiting or disabling text messaging from one or more electronic devices associated with an agreement performer may be implemented. This condition may be broadcast widely or locally to limit or disable text messaging if moving over a certain speed indicative of driving or may be conditional based on a location of movement, such as in a school zone. Any other condition or action that throttles information to one or more electronic devices associated with an agreement performer is in keeping with the spirit of the invention. Alternatively, or in combination, if an agreement performer has walked or run over a certain distance as per the GPS tracking on the electronic device associated with the agreement performer, then bandwidth or access may be increased. This may be utilized for medical purposes to ensure that the agreement performer is getting the prescribed amount of exercise. In addition, bandwidth or access time or access to particular games, websites, text messaging or any other electronic device usage may be increased for example on days with high smog or high pollen counts or based on any other external condition, whether medical or not.

In corporate settings, some employees are required to maintain competency in a particular area and are required to read or be tested. Embodiments of the system may be utilized to control electronic devices or limit information to/from/on electronic devices associated with employees based on their compliance with agreements. For example, embodiments may limit web access to work related websites or limit mobile phone usage within a building or any combination thereof, or otherwise as described herein, based on compliance with an agreement or an event or any combination thereof. Embodiments may be utilized within institutions such as jails to provide incentives for compliance with increases in bandwidth or type of information based on good behavior.

Any combination of hardware may be utilized to implement the system. In one or more embodiments, the agreement monitor is configured to execute on the server computer that for example be remotely accessed over a computer network. The information monitor and information throttle may execute on an electronic device associated with the agreement performer, or on a router, or a cable set top box, or any other computational component coupled with the system or any combination thereof so long as the information monitor and information throttle may limit monitored information associated with the agreement performer based on compliance with an agreement. In one or more embodiments, the information monitor is configured to interface with a proxy server or web filtering software, to enable existing hardware or software content filtering solutions to throttle monitored information based on compliance by an agreement performer, in addition to their inherent content filtering. In one or more embodiments, any electronic device on a local area network may communicate with any other electronic device on the local area network to coordinate or in any other manner communicate information regarding information monitoring and enforcement, for example using mDNS.

In one or more embodiments, monitored information includes telephone time usage, a number of telephone calls, a telephone number, a number of text messages, a location of the electronic device, a speed of the electronic device, a website address, a computer application that is running or has run or attempted to run, a game, a television channel, an image captured from the electronic device, an image captured from a camera coupled with the electronic device, a speed and location of the electronic device. Embodiments of the invention may implement an action configured to limit the monitored information to limit input to, output from or data exchange with the electronic device. Other actions may transfer money, send notifications to other parties, etc. Alternatively or in combination an action may be configured to limit the monitored information in a manner for example that degrade performances on the electronic device. This may be implemented as processing cycles or time delays that may be inserted between accepting input or displaying information or transferring information to or from the electronic device.

At least one embodiment of the system may control or throttle one or more electronic devices in an integrated manner or control or throttle information to/from/on one or more electronic devices associated with an agreement performer in an integrated manner, such as a telephone, a computer such as a laptop, tablet, smart phone, or a music player, a game controller, or a television, or any other device such as a network interfaced device or any information input or output device, or any apparatus with a programmable element such as a computer or any combination thereof.

In one or more embodiments, the action may be performed across two or more electronic devices associated with the agreement performer, for example a telephone, a computer, a music player, a game or a television, or any other information input or output device, or any combination thereof. In this embodiment, the agreement monitor is configured to sum the monitored information from each respective information monitor into a combined monitored information total and the information throttle is configured to limit the monitored information on each of the two or more electronic devices based on the combined monitored information total. This for example can be utilized to limit total time spent by a child online, watching television, playing electronic games, texting and talking on the phone, so that the child for example may do any of these activities so long as the time spent doing all of the activities is less than a particular threshold, after which for example a degraded performance may be employed on one or more of the electronic devices if desired. Although this example relates to time, it may also relate to any monitored information. For example, limiting a child to 1 hour web browsing across all electronic devices such as a cell phone, tablet computer and laptop computer is accomplished by adding the usage from all monitored devices and throttling all devices when the limit is reached. This sophisticated throttling of information is unknown in the art with respect to agreement compliance and known content filters and makes the agreement monitor the enforcer, not the parent.

At least one embodiment of the information throttle or agreement monitor or any other component in the system is configured to notify the agreement creator based on the compliance. This can be in the form of an email, text message, web page, voice message, or any other type of communication and may include a display such as a visual or audio display of information related to the compliance. In addition, the agreement monitor may be configured to display information to the agreement creator or other party related to an attempt to bypass the action configured to limit the monitored information by the agreement performer. For example, electronic devices having cameras may take videos or pictures, for example with forward or reverse pointing cameras and send the pictures to a parent, and/or perform face recognition on any images to determine if the child that is associated with the electronic device is really the one using it. The system may then send an attempted bypass message to the parent or other child's parent not using the system, after looking up the face in any social media accounts associated with the child, and for example upsell the system to the other child's parents. Alternatively or in combination, the agreement monitor is configured to display information related to the compliance and the monitored information. The agreement monitor is generally configured to accept input from the agreement creator to define the condition and the action. All information that is monitored, and any events generated based thereon may be encrypted when broadcast, as may be the case for any conditions and actions that are communicated between devices as one skilled in the art will appreciate.

In addition, embodiments of the invention may be configured to allow a parent or other entity to data mine for rewards that may be utilized for a reward that is similar to a reward for a condition that another parent or person has utilized, for example with respect to a particular condition, e.g., a reward for an "A" on a final exam. Embodiments of the invention may also be configured to enable manufacturers to data mine for types of rewards or incentives and target a group of parents or persons that may buy certain types of products, for example based on agreements and conditions. This allows manufacturers to target parents of friends of a child that just won a particular reward for achieving a condition for example. Embodiments of the invention also enable parents or other persons to remain up to date on items popular amongst children that are based on agreements that other parents have entered and which have resulted in rewards for meeting conditions of the agreements. This allows parents to receive product literature, overviews, pictures, movies, blogs or other information to keep a parent "hip". Embodiments of the invention may be configured to display potential rewards on an electronic device being utilized by a person, for example based on bandwidth usage based on information monitoring with respect to a condition of an agreement, to provide further incentive to perform a task for example. Alternatively or in combination, embodiments of the invention may also provide popups or text messages during game play showing tasks to be completed according to agreements. This capability allows a child to see a potential reward for studying, for example while playing a game, wherein the child may make a decision to go study or simply to remind the child that a test is coming up or that homework is due. Embodiments of the system may also determine if a child is communicating with a known sex offender, for example based on sex offender maps and IP tracing, and alert a parent and potentially throttle other forms of electronic device utilization to further protect a child. Embodiments of the invention may also alert a parent when a child's friends have gotten in trouble or are not meeting their agreements, so that a parent may limit a child's interactions with particular people or groups. Embodiments may be utilized in a one-person configuration to throttle usage based on addictive behavior such as online gambling or obsessive pornography viewing. Embodiments of the system may also allow for information in the system to be data mined, wherein an agreement database having multiple parents and children is mined to determine whether a parent is strict or not strict, or to rate how strict a parent is being with respect to other parents, agreements and conditions, or in any other manner rate what kind of parent a parent is based on how a child is performing and the rewards that a child is receiving for example. Embodiments of the invention may also provide tips or recommendations based on parent and/or child behavior with respect to agreements, for example as data mined to achieve better performance by the child. The system may provide a suggested type of action to take based on levels of performance of conditions by a child for example. Data mining may also be performed to detect attention deficit disorder (ADD) or any other medical condition, for example by mining for patterns in monitored information, such as reaction time in games, grades and derivatives of grades to determine if a child is improving or getting worse for example with respect to certain medications. Data mining may be utilized to suggest alternative courses of treatment that increase or decrease the throttled information or enable or disable particular forms of communication, channels, apps or games, etc., to improve an agreement performer or the performance of an agreement performer, for example with our without data mining information related to medical information.

Embodiments of the invention may be configured to enable payment for data mining of the information regarding activities, usage, equipment identification or any other quantity stored in any element of the system. Embodiments of the invention may also be purchased on a fee for use basis, monthly basis, enterprise basis, or in any other manner.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An agreement compliance controlled electronic device throttle will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Embodiment of the invention 100 may be utilized to throttle, or in any manner limit, alter, decrease or increase the functionality of electronic devices and/or throttle, or in any manner limit, alter, decrease or increase the information that is input to, output from, used on or exchanged with electronic devices based on compliance with an "agreement". An agreement includes one or more conditions to satisfy the agreement, such as one or more tasks or activities to be performed by an agreement performer or events that may be encountered or monitored, and actions that are performed to enforce or assert the agreement with respect to any or all electronic devices associated with the agreement performer. Any electronic devices may be throttled including but not limited to telephones, computers, games, televisions, music players, vehicles, cars, motorcycles, remote controls for audio/visual components, household devices or any other stationary or moveable object. For example, embodiments enable throttling of electronic devices or associated information based on whether an agreement performer such as a child has finished assigned homework, chores or extracurricular activities or events such as weather or health related for example or any combination thereof to redefine the experience of parenting. Other embodiments may be utilized for improved compliance and control of electronic devices in corporate or institutional settings or self-compliance single user settings.

Figure 1:
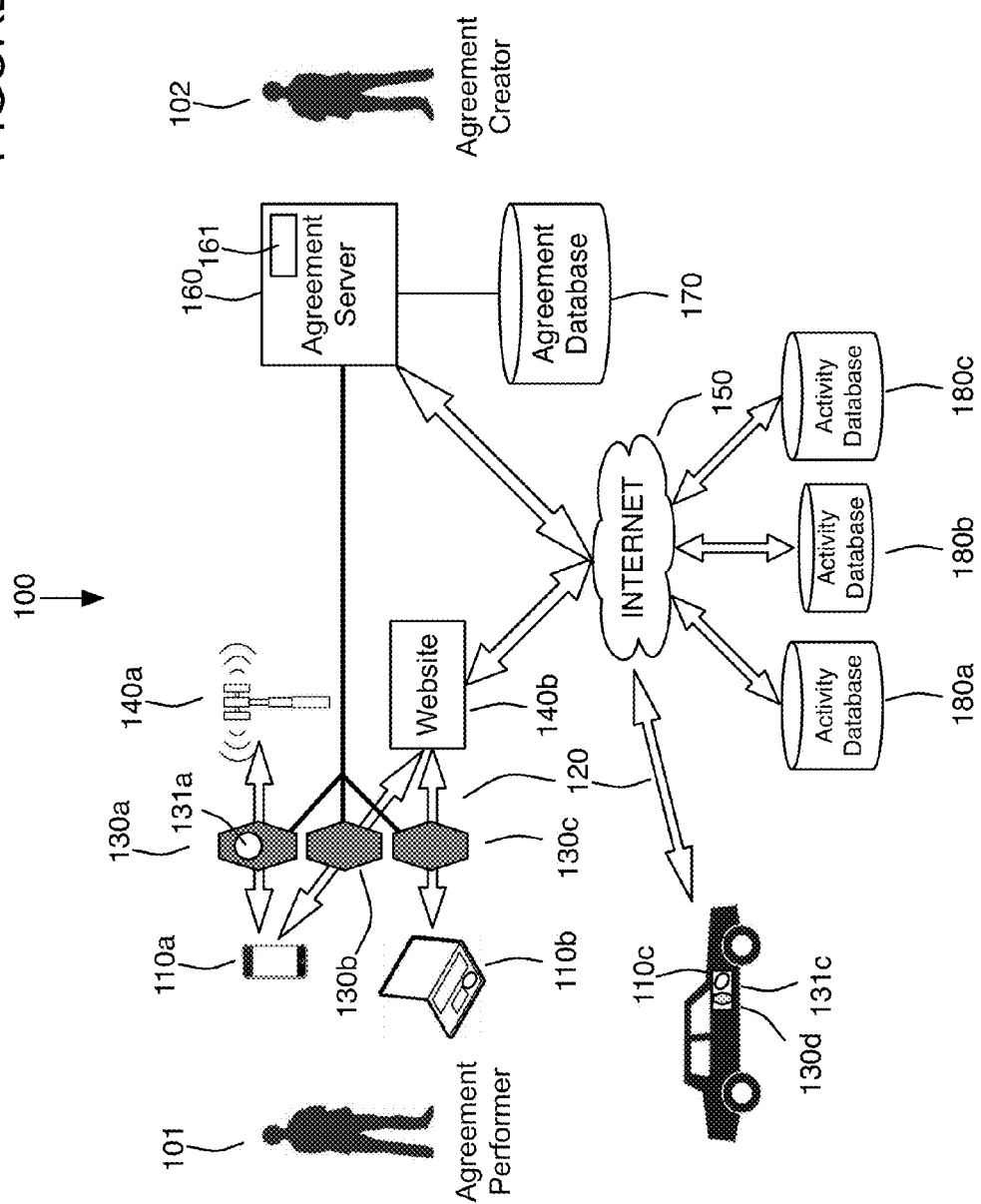
FIG. 1 illustrates an architectural view of an embodiment of the agreement compliance controlled electronic device throttle system.

FIG. 1 illustrates an architectural view of an embodiment of the agreement compliance controlled electronic device throttle system 100. Embodiments generally involve an agreement that may be between two roles, which may be played by one or more humans, for example agreement performer 101 and agreement creator 102. Agreement creator 102 may be an employer or parent for example, while agreement performer 101 may be an employee or child, or for example may represent other relationships such as a doctor and a patient, warden and prisoner, etc. Alternatively, agreement creator 102 may be agreement performer 101 or agreement performer may include a group of two or more individuals, groups of parents, clubs, circle of friends, etc. The agreement is utilized to throttle electronic devices 110a, 110b, 110c by setting parameters or other information that limits or alters their functionality in some manner or throttles information to/from/on electronic devices 110a, 110b and 110c and any other electronic devices associated with the agreement performer in an intelligent and integrated manner. In one or more embodiments, the agreement includes conditions involving activities or events or any combination thereof that are generally created by the agreement creator or which may be default agreements. Only three types of electronic devices, including the control computer 110c of the vehicle, are shown for brevity, however the system may interface with any type of electronic device, as previously listed above.

System 100 may access and store agreements in agreement database 170, or in any other component of the system for example. The system may utilize agreement monitor 161 for example implemented as hardware in the form of a specific functional element, software or firmware that executes on agreement server 160, or on any other component that is coupled with the agreement database and the activity database. The agreement monitor is configured to check if a condition has been satisfied to determine compliance. One type of condition may be based on activity status in activity database 180a, or 180b, or 180c or otherwise communicated to the agreement server in any manner. One form of activity database is a School Information System or SIS, which holds assignments, tests, grades, dates and other school related activities and associated status. The databases may be accessible over Internet 150, or in any other manner for example. Another type of condition may be based on an event that may be discovered or otherwise determined by the system by polling, or by receipt of an event or by searching or in any other manner employed by the agreement monitor or information monitor discuss discussed below. Internet 150 may be utilized by the system to obtain events related to weather, health, allergies, finances, road conditions or any other type of data that may be accessed on Internet 150 and for example that may form part of a condition of an agreement for example.

An information monitor such as information monitor 131a, 131b or 131c may be utilized in many configurations wherein the information monitor is configured to determine monitored information associated with an electronic device that is associated with the agreement performer. The information input to, output from, used on or exchanged with or in any other manner utilized by electronic devices 110a, 110b and 110c and that is transmitted and/or received is depicted with arrows 120. Alternatively, or in combination, the information monitor may locally check conditions based on the monitored information to determine when a limit is reached. For example, if a certain number of text messages have been sent/received in a month, the system may limit or block access to all text based applications on all devices associated with a child/employee by broadcasting the monitored information and/or limit event to the agreement server and/or other electronic devices associated with the agreement performer. By determining the monitored information, for example the application being utilized, the information being viewed, the amount of text messages input, etc., the system may locally throttle one or more software apps or applications, or throttle the amount or speed of that monitored information, or allow or block the information altogether, for example to/from cell phone tower 140a or website 140b or any other information source, or directly throttle the device, i.e., set maximum acceleration or speed parameters for vehicle with computer 110c.

In one or more embodiments, the system utilizes information throttle 130a, 130b, 130c and 130d coupled with the agreement monitor and optionally with the information monitor wherein the information throttle is configured to perform an action, based on the compliance with the condition by the agreement performer. Information throttles 131a-d may throttle increase or decrease capabilities or functionality or information related bandwidth or information type. For example if employee 101 has not completed a required corporate training session, their bandwidth or access to text messages or websites may be decreased for example by throttling electronic devices 110a, 110b, 110c or information to/from/used on electronic devices 110a, 110b, or 110c. Alternatively, throttling of bandwidth or type of information may be increased, for example in the case of an event such as high pollen count or smog alert that the system detects or is otherwise made aware of. This encourages children or employees to remain inside to use electronic devices in case of hazardous outdoor conditions or alternatively encourages children or employees to locate outdoors in healthy conditions.

Thus the information throttle may be utilized to set information parameters within the electronic device to alter the functionality or otherwise control the device in addition to throttling information associated with the device. These types of actions may dim the screen, play sounds, slow the device or set parameters that alter the acceleration, maximum speed, total distance allowed for travel of the electronic device, for example when coupled with or mounted in a vehicle. Alternatively, the information throttle may increase information parameters that increase the functionality of the device, for example when a website determines that the outdoor pollen count is too high, implying the agreement performer should stay inside and surf the web or that the vehicle may have a higher speed setting based on road conditions.

For example, one or more embodiments of the invention may set the maximum acceleration setting in engine control computer 110c coupled with the vehicle that controls the vehicle based on performance on homework or a grade obtained on an examination as part of an agreement condition, or based on an event such as a weather event that is discovered by the system when a weather website indicates a chance of slippery road conditions or an accident local to an area where the vehicle is currently travelling or any combination thereof. Embodiments of the invention may throttle information parameters up or in an any increasing fashion as well, wherein the acceleration setting in computer 110c on the vehicle may be increased to allow for more aggressive driving performance if the agreement performer has complied with an agreement or in case of emergency as determined by the system or in case of exiting an area where an accident has been passed. Furthermore, the volume of a car radio or stations allowed, or a music player utilized which represents computer 110c in this embodiment, whether or not moving in the vehicle, may be set based on the activities of the agreement performer, for example good grades or bad grades, or based on the weather events for example to set a station automatically to a weather or hazard channel if the weather event detected is of a particular nature. The combination of setting or throttling devices themselves or information associated therewith may be based on activity type conditions and event type conditions or any combination thereof, which is unknown in the art.

In one or more embodiments of the invention, the agreements may include actions/limits that are performed or enforced before a condition is satisfied. An information throttle may execute locally on devices 110a, 110b and 110c or remotely, for example on a router or other component not shown for ease of illustration, or in any other hybrid or distributed architecture. In one or more embodiments of the invention, the information throttle may be combined with or associated with the information monitor or part of the same functionality or apparatus. The information throttle may implement the action wherein the action is configured to limit the monitored information associated with one or more electronic device, for example slow or limit the number of text messages on a cell phone, display of web pages for any set of web sites, display a reminder on a television to finish homework if changed to a particular channel or program, or in any other manner limit, allow or block information, transfer money, perform notifications or take any other action not directed at limiting information on the electronic device, but in support thereof for example. Information may be locally monitored and enforced, for example the information throttle may locally limit the application, i.e., exit the application or slow it or limit it in any other manner if a local limit is reached for example, without requiring a data transfer over arrows 120, especially if the network is unavailable for example or for example if the condition does not depend on an external activity.

For example, electronic devices 110a, 110b and 110c may communicate over a LAN or using technologies such as BLUETOOTH® or any other wireless networking technology to discover and/or communicate monitored information and/or limits and/or actions between the devices. Any electronic devices may broadcast an agreement performer identifier and monitored information, which may be communicated in any encrypted manner for example. Embodiments of the invention may perform in a non-standalone or integrated manner in order to disable all texting on all devices associated with a child if a text message is sent from a particular location, for example if "grounded", or while moving over a threshold speed indicative of driving which is unknown in the art. In one or more embodiments of the invention, if a text message is sent via a mobile computer or tablet and a cell phone associated with the child is moving over a certain speed, then the computer or tablet may block access by obtaining a speed event from the cell phone and determine that the child is attempting to bypass text throttling through use of a device other than a cell phone to send a text message. This may be implemented by the information monitor 131b for example executing on electronic device 110*b* that intercepts input text characters, either from the input devices by intercepting input characters from the device drivers for the input devices, or from applications or browsers running applications that provide events that are sent to the information monitor which then broadcasts the application, event, and information or any combination thereof to any other electronic devices associated with the agreement performer. Once the other electronic devices receive the monitored information message, they may locally sum the usage and implement limits or pass the summed usage to an information throttle to implement the limit on the device. Any other mechanism that enables multiple electronic devices to obtain monitored information and throttle information based thereon is in keeping with the spirit of the invention.

The compliance and activity status may be based on trust, evidence or confirmation or any combination thereof. For trust-based assertions of activity status or completion, the agreement performer is allowed to set the status, e.g., assert that an activity has been satisfied, which may or may not fully satisfy a condition that asserts an action. In evidence-based compliance, the agreement performer is required to set status and provide evidence or submit any information that corroborates the status of the activity. This type of compliance may be utilized until trust is formed between the agreement creator and agreement performer for example. In confirmation-based compliance, the agreement performer submits the evidence. For example, activity status may be input for any type of compliance monitoring to an activity database 180*a-c* or to the agreement server, or for example on any electronic device 110*a-c* or via website 140*b* or via any other apparatus that may communicate with the system. For confirmation-based compliance, the agreement creator may then confirm that the activity has been satisfied before the condition enables an action to be performed for example. Any other granularity of compliance monitoring or assertion is in keeping with the spirit of the invention. Any type of interface may be utilized for input of the activity status by the agreement performer including a checkbox, character entry, mouse click, touch screen entry, etc., as one skilled in the art will appreciate.

In a parent/child embodiment, a parent may embody agreement creator 102 and may propose an agreement with a condition such as "IF all assigned homework is completed by 9 PM" and an action such as "enable social media websites for 1 hour at unlimited bandwidth across all electronic devices associated with an agreement performer, and 1 hour with 50% speed degradation up to 20 text messages". In this scenario, a child may embody agreement performer 101, and may agree to the conditions in order to obtain access to information, including websites, television shows, text messages, phone minutes, game time, music, etc. In this scenario, the condition is effectively an activity to be performed by the agreement performer, which may be stored in activity database 180*a* or anywhere else in the system for example. In other scenarios, the condition may be related to an activity performed by a third party, such as "if payment in bank account received is greater than $50" for example as a result of performing chores, then an action of "enable text messaging" for example may be implemented on the mobile phone associated with the child, for example if the child has earned enough money from a job or chores. Although not shown for ease of illustration, any other database may be accessed, for example by the agreement server including financial databases at a bank, medical databases associated with the agreement performer, or any other database including weather, and pollen related databases or websites or any other external information that may be obtained by the agreement server for example over Internet 150. Conditions may also include time components in addition to an activity, for example when some activity is due. Alternatively, or in combination, the time component may include a time range, for example a time start and time stop. The time component may be in any format and include any temporal information including a day, date, recurring interval such as "every other Friday", or any other description related to time. Embodiments of the invention may implement actions that throttle or limit monitored information in any manner. For example, actions may include a time limit that limits an amount of time that the monitored information may be utilized or displayed on the electronic device, or a total across all electronic devices associated with a particular agreement performer, a numerical limit that limits a number of data entries associated with the monitored information, a web limit that limits access to a website associated with the monitored information, an application limit that limits access to an application associated with the monitored information, a game limit that limits game parameters associated with the monitored information, a television limit that limits a television program or channel associated with the monitored information.

Figure 7:
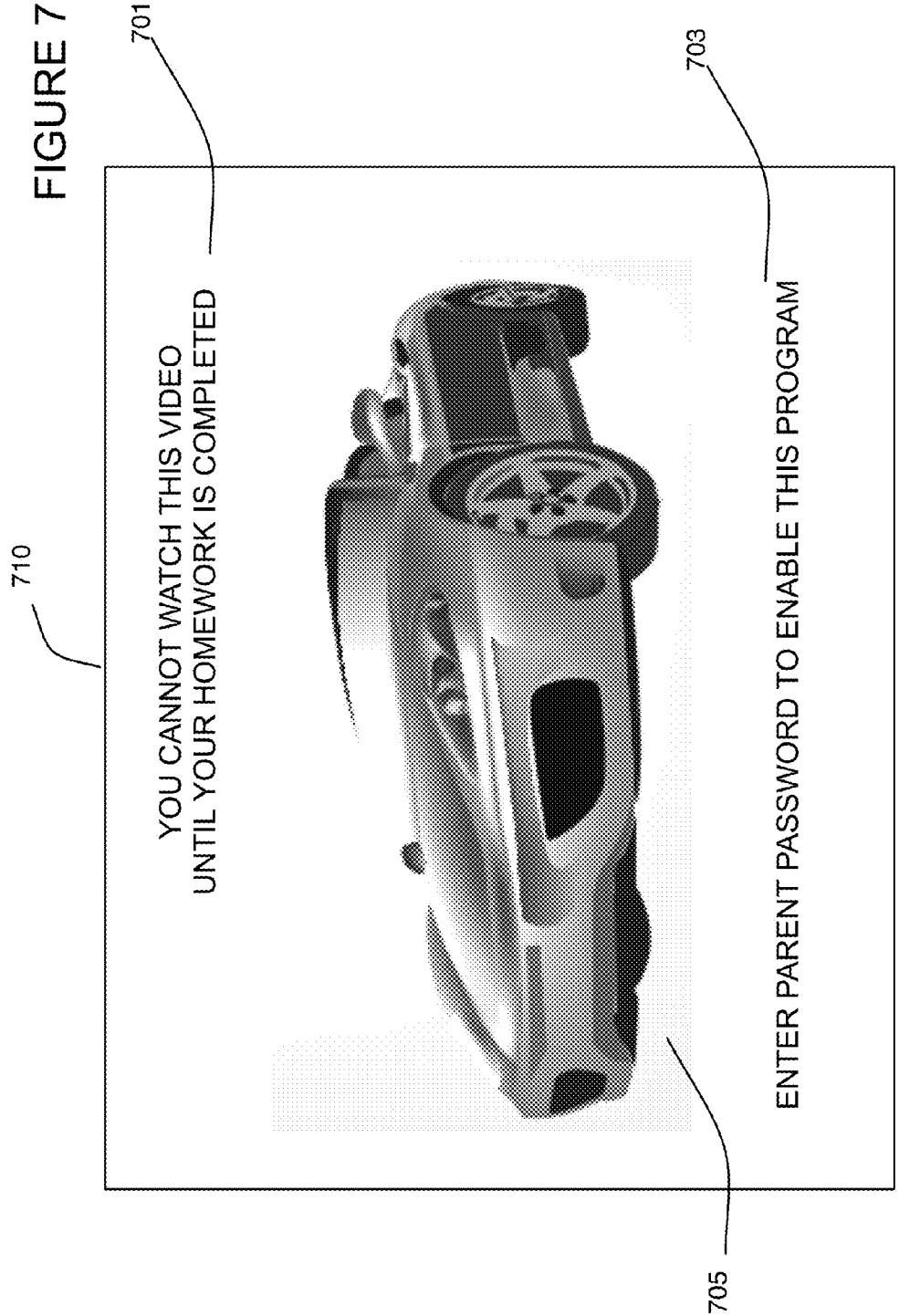
FIG. 7 illustrates a display coupled with a television, cable set top box, satellite set top box, or website video interface with condition information shown on a throttled program, channel or video, along with an override password entry option.

FIG. 7 illustrates a display coupled with a television, cable set top box, satellite set top box, or website video interface with condition information shown on a throttled program, channel or video, along with an override password entry option. For example, on a television, a child may have a particular favorite program that may be monitored via a set top box that other members of the family may or may not watch, or the television may be in an area accessed by the child. If an action limiting a channel is taken based on activities, then the cable set top box may show message 701 on an associated television showing the channel stating, "you cannot watch this video until your homework is completed", optionally with the name of the child needing to finish homework. Video interface 710, may couple with or be part of a television, computer display, video based website, electronic game interface or electronic device applications or any other device that enables video 705 to be displayed. Status message 701 is displayed or otherwise overlaid in one or more embodiments to show any type of information such as the amount of time left in viewing or total electronic device usage, and/or a message that states that the channel, program or video throttle limit has been reached until an activity is complete, e.g., homework has been completed as is shown. If someone else is watching the program, then the parent may override the limit as shown with password override 703. Access to a website that hosts videos may have a more direct authentication, for example through use of a webcam associated with a computer to determine which person is attempting to access videos based on images taken from the webcam associated with the computer that are then processed via facial recognition software or via other authentication methods, e.g., password and user account authentication. As shown, an information throttle may utilize an existing programmable interface within the cable set top box, computer operating system or API to display text or information, or may set the graphics or text values in memory which is automatically displayed, or alternatively generate the characters inject them into the output video feed which is then displayed on the television or computer monitor, or display the information in any other manner.

Figure 6:
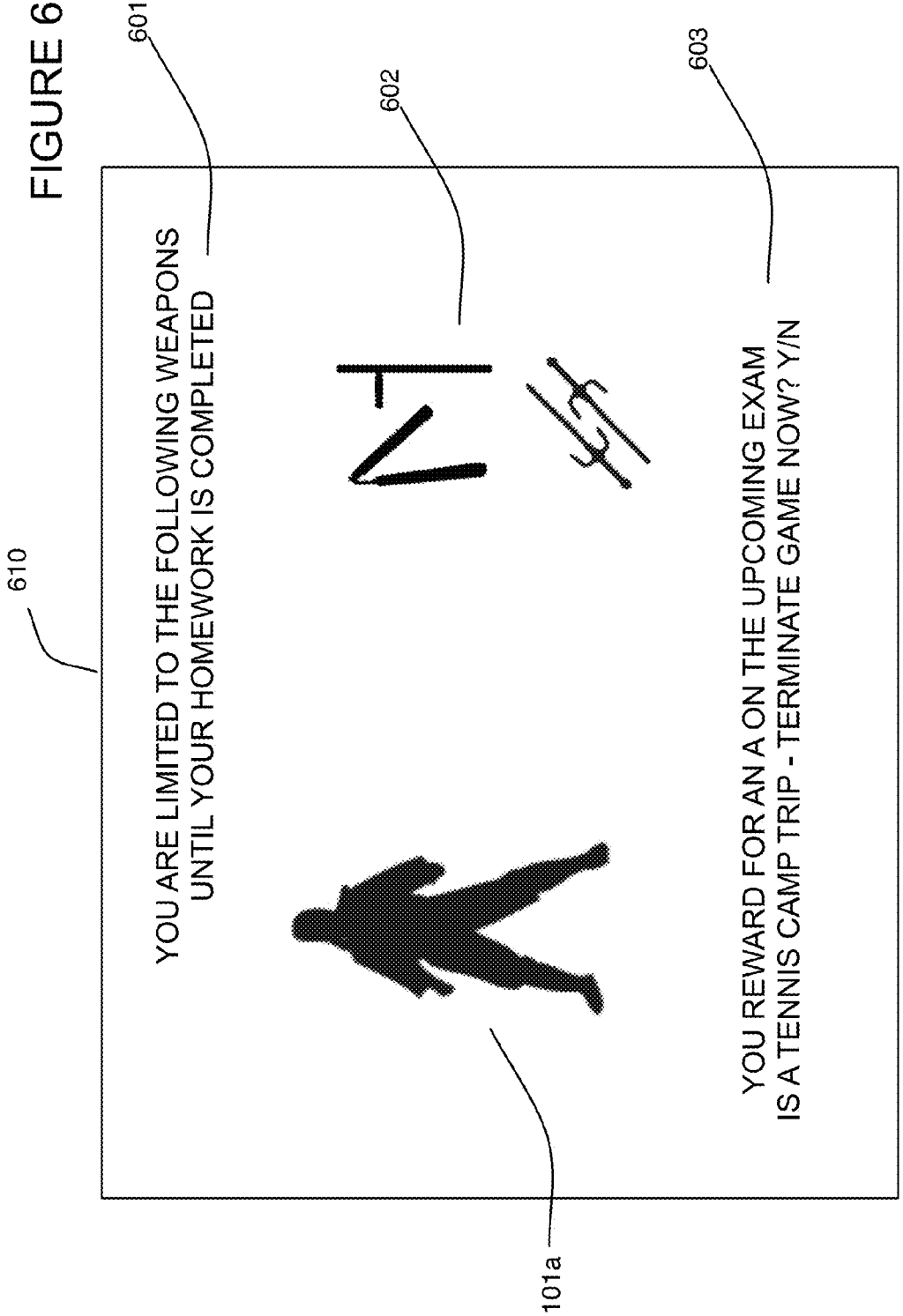
FIG. 6 illustrates a game interface showing an avatar of an agreement performer in the game, along with throttle information based on current information monitoring and limits in conditions along with a reward for performing an activity.

FIG. 6 illustrates a game interface showing an avatar 101*a* or game piece or player associated with agreement performer 101 in a game, along with throttle information based on current information monitoring and limits in conditions along with a reward for performing an activity. With respect to games such as electronic games, an action of "limit game powers of soldier to have only type 1 weapons for game XYZ" may be implemented on a electronic game to limit attributes of a child until all of their homework is complete. This is shown as throttle information 601 and limited throttle options 602, which may be shown with text or graphically, which other local or remote users in the game may or may not see along with the action and/or reward associated with any upcoming activities. The agreement performer may be asked whether they would like to quit the game and earn their reward for completing a task, for example for completing their homework. In one or more embodiments of the invention, the game application makes calls to embodiments of the invention requesting current limits for game play or total combined usage limits associated with the game player, i.e., agreement performer 101. In other embodiments of the invention, the operating system on the electronic game hosts a service that implements the information monitor, which intercepts inputs and sends messages to the game to introduce notifications, etc., when external events occur on the agreement server or when limits are reached. In other embodiments, the information throttle may send the messages and/or disable the game, or introduce CPU cycles to slow the game for the agreement performer or delay inputs by the agreement performer to make the game less responsive, for example while homework is still to be done. This may be performed by the information throttle accessing the game or computer operating system and injecting cycles or using interfaces to the game application for example as one skilled in the art will appreciate. In other embodiments, a router may implement an information monitor or information throttle that closes ports after game limits have been reached or when total combined usage limits have been reached. Any combination of the above implementations may also be utilized in keeping with the spirit of the invention.

As limits are being accumulated per device, the limits may be combined to form a total limit of play time for example and agreement monitor 161 may add the usage of all electronic devices based on information gathered from information monitors 131a and 131b and add them together to derive the total time that is then utilized by information throttles 130a, 130b and 130c to then throttle the information on those devices to slow them significantly or disable them altogether once a threshold of monitored information is reached, whether on a per device or across-device basis. Activities may originate from the electronic devices themselves and may include any output that each electronic device is capable of generating, such as the output results of character inputs, to determine if a child has read an entire chapter, or completed an electronic test for example. Regardless of the origin, the activities may be saved locally and/or remotely in agreement database 170. Conditions, for example the that specify event and values thereof or ranges may be utilized including but not limited to orientation, location, speed or any other characteristic of an electronic device, along with a description of the application being used may then be utilized to assert an action, for example to limit text messaging across any or all devices, if driving for example. Events such as location-based events may be checked against agreements to find out whether to assert an action to control an electronic device or throttle information to/from/on the electronic device. For example, if a child is grounded, then bandwidth may be decreased or terminated outside of the grounded area and increased when the child is within the grounded area. In addition, events such as predefined distance events that occur if an agreement performer has moved themselves over an agreed upon distance and for example under the speed associated with a car may be utilized to throttle or increase the amount of bandwidth or type of data that the agreement performer may interact with or game playing levels may be increased or more aggressive games may be allowed or more weapons may be enabled within games or playlists with more energetic music may be enabled, etc. The activities may be recorded into the activity database associated with the activity, namely 180a, 180b or 180c or in any other manner recorded, for example locally until a network connection is obtained. Any local area network devices associated with the agreement performer may query and find each other using any type of network protocol, such as mNDS and share monitored information and throttle local devices accordingly.

Figure 2:
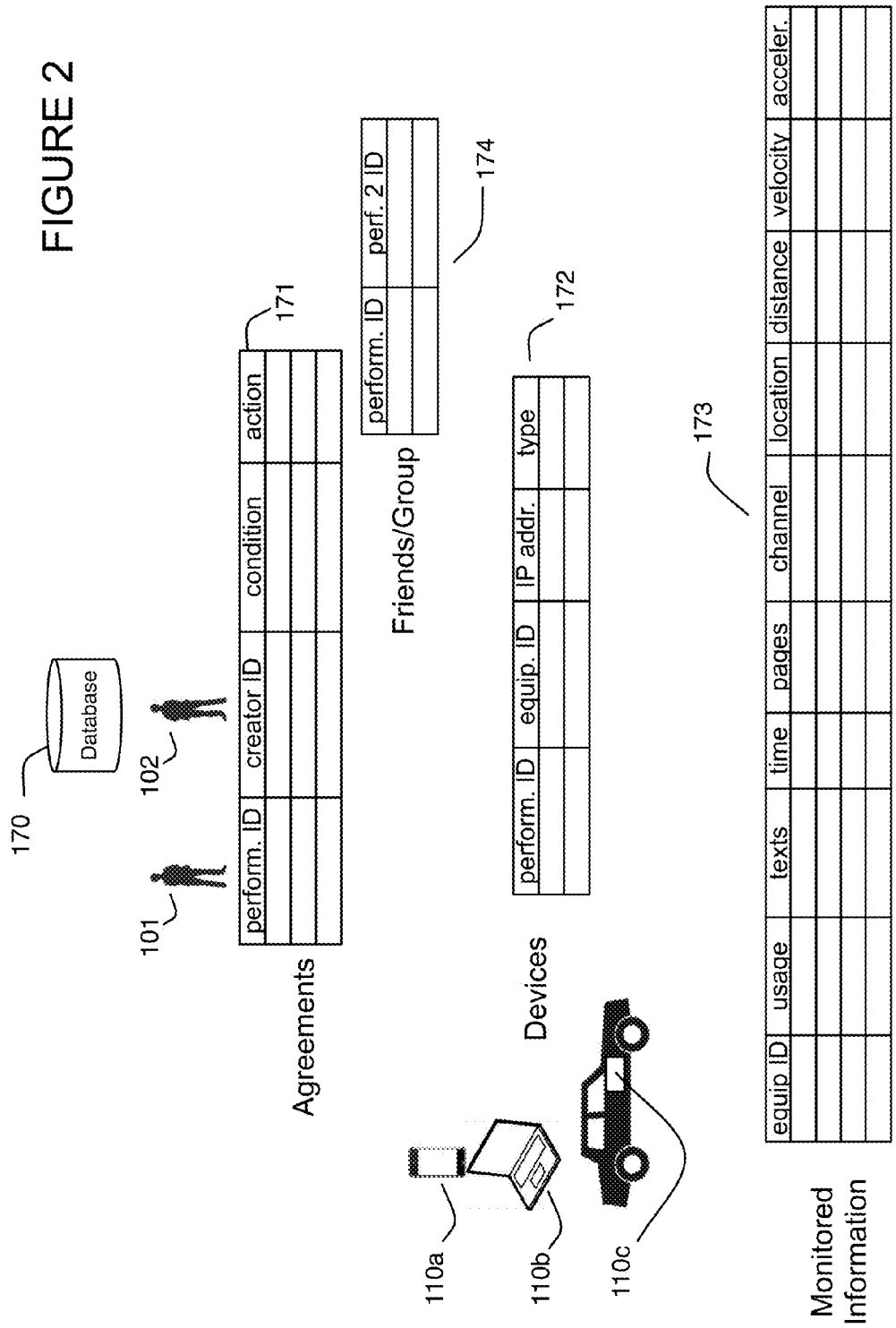
FIG. 2 illustrates an embodiment of a schema utilized in an embodiment of an agreement database.

FIG. 2 illustrates an embodiment of a schema utilized in an embodiment of an agreement database. Agreement database 170 may be an object oriented or relational database as shown for ease of illustration, or any other type of data retaining apparatus. This may include memory, distributed memory or any other type of device that is configured to retain data. The agreement held in the agreement table 171 generally includes information such as fields that related to a first unique identifier associated with the agreement performer, shown in the figure as a "perform. ID" field, a second unique identifier associated with the agreement creator, shown in the figure as "creator ID", a condition to be satisfied by the agreement performer, shown as the third field, and an action to be performed based on compliance with the condition by the agreement performer shown as the fourth field. Conditions may be in the form of text or XML or keys into other tables or references to other objects. The format of the conditions may be any format so long as the activity or event and associated action may be associated with one another. In addition, information related to the electronic devices associated with an agreement performer may be stored in device table 172 for example with the unique identifier of the agreement performer and a unique identifier associated with each electronic device, which is shown as the "equip. ID" field, with an address such as an IP address, or any other address, phone number of manner of identifying the particular electronic device, along with a type field for the type of the electronic device, which may for example be a manufacturer, model or serial number or any other quantity associated with the particular electronic device or any combination thereof. In addition, monitored information may be stored in monitored information table 173, with respective quantities for the types of information that the device may input, output, use or exchange. This table may alternatively be stored local to devices 110a-c or in any other component in the system in a distributed manner and communicated to the agreement monitor, or alternatively the agreement monitor may run local to a device or in any other configuration so long as throttling can occur. This may include fields such as usage, texts, time, pages, television channel, television program, game, location, distance traveled, velocity or acceleration values obtained from any device in the system, or any other quantity. The information may be stored and purged as desired for particular time periods for storage saving considerations or may be retained in entirety for data mining purposes for example. Embodiments of the invention may be configured to enable payment for data mining of the information regarding activities, usage, equipment identification or any other quantity stored in any element of the system. Embodiments of the invention may also be purchased on a fee for use basis, monthly basis, enterprise basis, or in any other manner to enable access to any records or any information in database 170, 180a-c across one or more agreement performers or agreement creators. In one or more embodiments, agreement server 160 may be utilized by a data miner to access information in the system, including but not limited to any of the fields or tables or other data shown in FIG. 2, or any other information utilized and saved by the system. Although not shown for brevity, other tables for personal data associated with the agreement performer and/or agreement creator may be utilized to store financial, medical, weather or allergy-related, or preference data or any other type of data, which may also be data mined, for example using agreement server 160. One or more embodiments may utilize tables that have a foreign key or other indicator to tie the records or objects to a particular agreement performer or creator, as one skilled in the art will recognize. This type of data may also be mined along with any of the other data utilized in the system, (see FIG. 11 for an example data mining interface). In addition, other tables including a "friends" or group table listing all friends of a child, or coworkers in a group associated with a child or employee i.e., perform. ID as the key, with friend ID, or second performer ID as shown, as a field, optionally with contact information, parent contact information, privacy level of access, associations/clubs/common activities, etc., may also be stored in any desired level. The friend associations may also be data mined and otherwise processed to determine optimal sets of friends for a child, and to alert a parent for example if one of the child's friends is in trouble, grounded, getting bad grades, etc., so that the parent may take appropriate corrective action as soon as possible.

Non-time oriented conditions, or conditions based on events may also be implemented, for example if a speed of an electronic device is indicative of driving, an action such as limiting or disabling text messaging from one or more electronic devices associated with an agreement performer may be implemented. This condition may be broadcast widely or locally to limit or disable text messaging if moving over a certain speed indicative of driving or may be conditional based on a location of movement, such as in a school zone. For example, speed and range may be utilized with respect to cell phones that commonly have GPS chips or other location based functional element such as cell tower triangulation location features. In this scenario a condition may be "if agreement performer is travelling faster than a defined speed at a particular location" with an action of "ground individual by sending messages to the agreement performer and agreement creator and limit cell phone usage to home number and 911 only and enable only informational television programs". By monitoring the speed of the cell phone and monitoring the location, which can be translated into a speed limit on each street being traveled, the system may ensure that the child is not in a vehicle that is speeding, whether driving or not. Conversely, if the cell phone has not moved during school a warning action may result in a text message to a parent notifying the parent that the child is attempting to circumvent the system by leaving the cell phone in a locker for the lunch period, or for example is texting using an app on a mobile computer or tablet other than the cell phone. Any quantity that may be monitored may be utilized to perform an action that limits or throttles information, or transfers money or notifies an interested party or performs any other action. The schemas described are not limited to the fields described and may be implemented with any other fields or the fields described or any combination thereof as desired for the particular implementation and electronic devices to be utilized with embodiments of the system for example. Any other condition or action that throttles information to one or more electronic devices associated with an agreement performer is in keeping with the spirit of the invention. Alternatively, or in combination, if an agreement performer has walked or run over a certain distance as per the GPS tracking on the electronic device associated with the agreement performer, then bandwidth or access may be increased. This may be utilized for medical purposes to ensure that the agreement performer is getting the prescribed amount of exercise. In addition, bandwidth or access time or access to particular games, websites, text messaging or any other electronic device usage may be increased for example on days with high smog or high pollen counts or based on any other external condition, whether medical or not.

Figure 3:
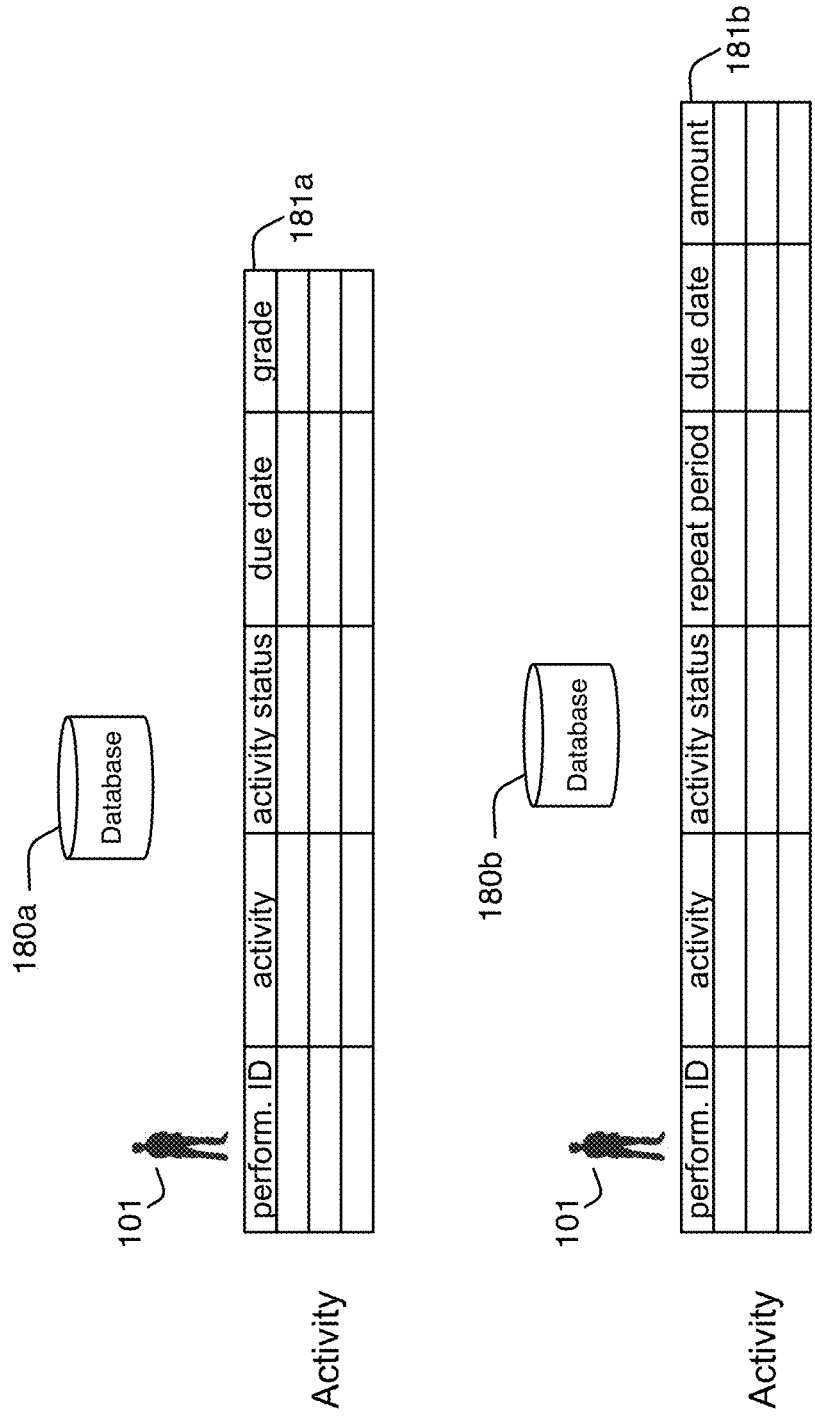
FIG. 3 illustrates multiple embodiments of schemas utilized in embodiments of activity databases.

FIG. 3 illustrates multiple embodiments of schemas utilized in embodiments of activity databases that contain activity status associated with the condition to be satisfied by agreement performer 101. Activity databases 180*a* and 180*b* may be integrated with the agreement database or separate or distributed in any manner as desired. As shown, the activity databases may include fields that describe the activity, activity status such as complete or not or a percentage complete for example, a due date or any other temporal quantity related to a task including start date, repeat period, or any other quantity along with performance data such as a grade. One or more embodiments of the invention may interface with or otherwise utilize one or more activity databases that include activities related to schoolwork, chores or extracurricular activities or any combination thereof. Activity table 181*a* may for example be targeted at homework or be part of a school information system (SIS), while activity table 181*b* may be targeted at chores and include amount of payment for particular activities such as mowing the lawn for example. Any other schemas may be utilized as desired so long as they are capable of associating an agreement performer with an activity and status thereof. For example, an activity database such as a school information system that includes homework activities and other assignments or tasks and associated activity status may be utilized. In addition, a parent may implement a similar system with chore related activities including "mow the lawn every other Saturday" with associated activity status of True or False for the current time period. The associated action may include "enable 20 extra phone minutes" or "enable TV program XYZ" or any other action including "transfer $20 to allowance money card" for the payment of an allowance for example. The activity status may information related to completion of an activity assigned to the agreement performer in the form of Boolean True or False, or a range, which may be utilized a range of actions based on a condition of "grade A", "grade B", "grade C" conditions in a particular class or on a particular test or as a cumulative average across classes or any other combination thereof. This range of conditions may be utilized to provide a corresponding range of actions that correspond to the different grades, for example "provide unlimited web browsing", "degrade browsing speed by 20%", "send alert when electronic device is greater than 0.25 miles from home and send text to agreement performer stating You Are Grounded", to implement a "grounding" respectively. Compliance with corporate or institutional requirements may also be performed with any activity data store capable of holding the agreements associated with these types of entities.

Figure 4:
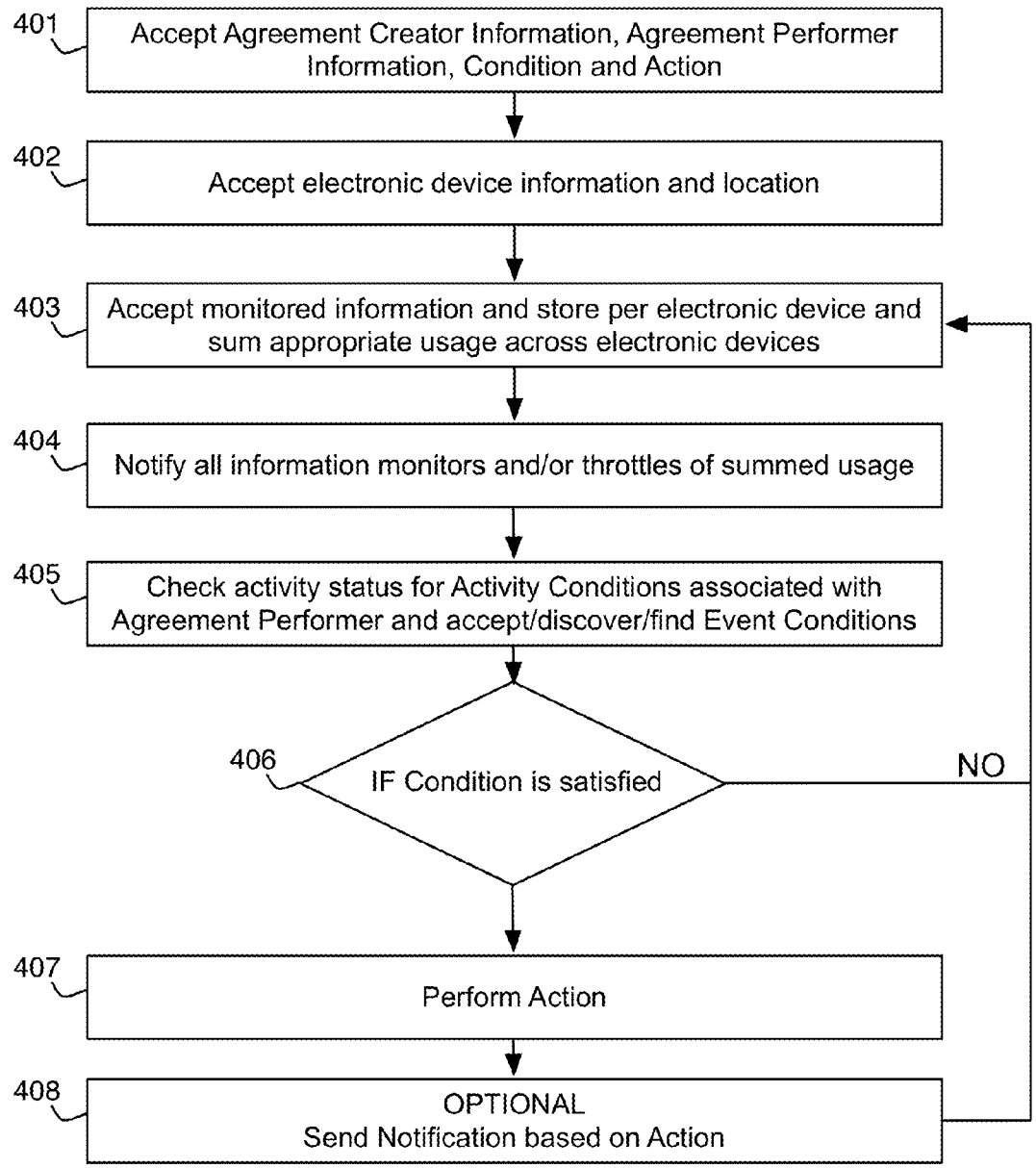
FIG. 4 illustrates at least one embodiment of the functionality employed by agreement monitor.

FIG. 4 illustrates an embodiment of the functionality employed by agreement monitor 161. As shown, the agreement monitor accepts input related to the agreement creator and agreement performer at 401 and in one or more embodiments of the invention creates unique identifiers for use in database 170 for example. In addition, the agreement monitor accepts at least one condition and at least one action. The information may be stored in any location in the system, or in multiple locations depending on the architecture employed, as one skilled in the art will recognize. The agreement monitor accepts any electronic device related information at 402, including any directly related IP addresses or phone numbers or television IP address, or any indirectly related information cable set top box identifier, any channels or shows that a particular agreement performer is known to view, or any other information which may be utilized to control information on the electronic device. The information monitors on the various electronic devices monitor information and sends the monitored information or characteristics of the monitored information to the agreement monitor. The monitored information may include key strokes, number of text messages, URLs, images from the screen of the electronic device or images taken with the camera of the electronic device, for example to ensure that the agreement performer is the one using the electronic device, speed and location of the electronic device or any other metadata associated with the device and not the input, output or exchange of data from the device. The agreement monitor may then accept the monitored information and sum usage or other information across multiple electronic devices associated with the agreement performer at 403. If there is no network connection available, but local BLUETOOTH® or other wireless local area network communications are available, then all of the local electronic devices may pass monitored information to one another to locally sum usage. The summed usage is sent to all electronic devices and/or information throttles at 404 for local use and to potentially implement previous limit settings, either from the agreement monitor or via local communications if no wide area network connection is available at the time. The agreement monitor checks activity status at 405 for activity-based conditions associated with the agreement performer and any accepts discovers or finds or in any other manner obtains events, such as weather, health, or any other events and when status changes or events occur, conditions are checked at 405. If a Condition has been satisfied, is within range or above or below a threshold, then the Action is performed at 406, otherwise, the agreement monitor accepts monitored information at 403. The action performed may be sent to all information throttles to update their local settings and enforce actions at 407 if conditions are satisfied. The action may throttle the electronic device or throttle information to/from/used/on the electronic device for example. Although shown as an event based architecture, the electronic devices may also poll the agreement server or other local electronic devices or any other device to determine if any condition has been satisfied. Any notifications may be sent at 408, for example to inform the agreement creator of compliance or non-compliance with the condition, or for status updates for monitored information for example. Alternatively or in combination, any apparatus in the system may be utilized to send any notification.

Any combination of hardware may be utilized to implement the system. In one or more embodiments, the agreement monitor is configured to execute on the server computer that for example be remotely accessed over a computer network. This is not required however and the agreement monitor may execute on any computational device in the system. For example, the information monitor may execute on a mobile phone associated with the agreement creator or in any other computational element or across multiple computational elements that make up the system.

Figure 5:
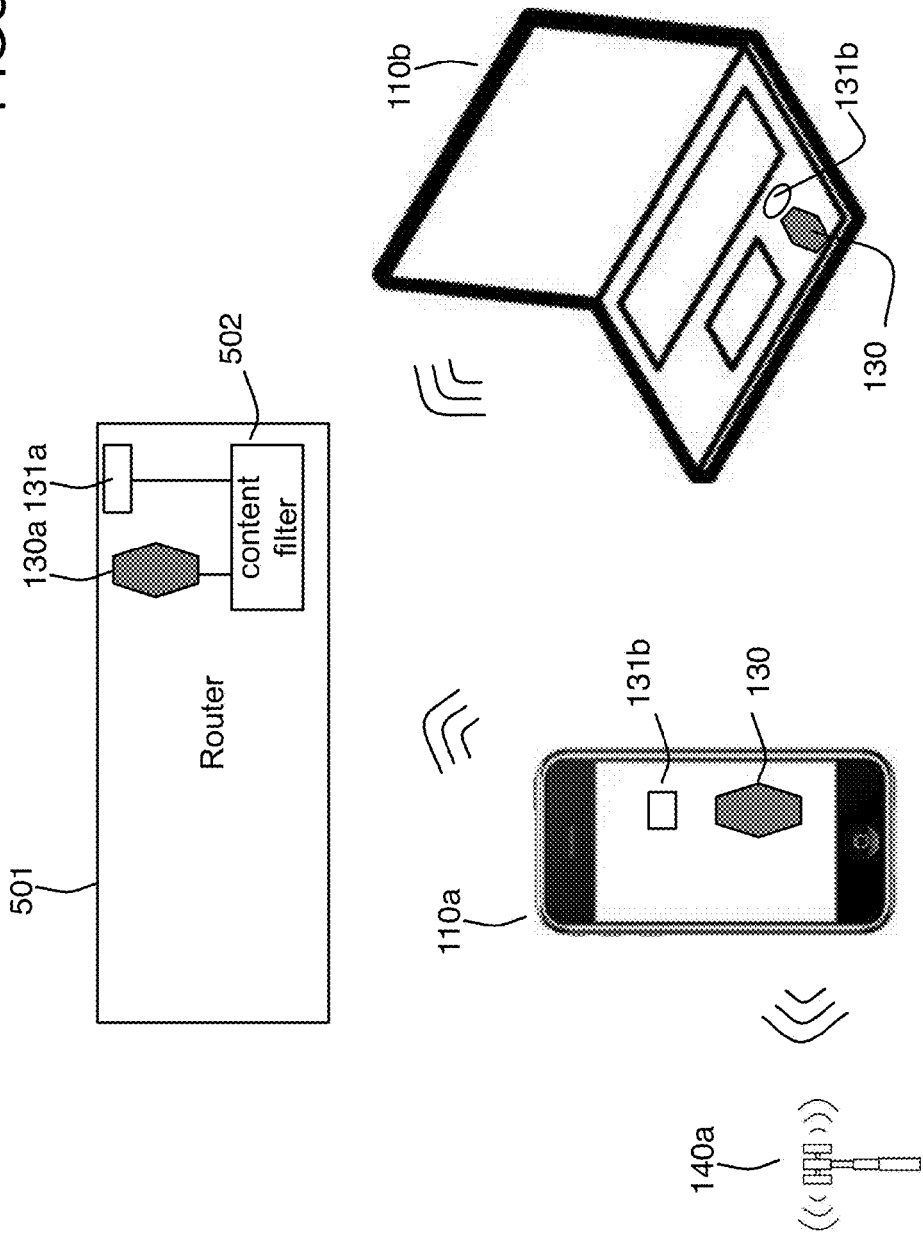
FIG. 5 illustrates embodiments of various components or electronic devices in the system that may be utilized to host an information monitor and information throttle or any combination thereof.

FIG. 5 illustrates embodiments of various components or electronic devices in the system that may be utilized to host an information monitor, information throttle and optionally the agreement server if desired, or any combination thereof. The information monitor 131*a* or 131*b* and information throttle 130*a* or 130 may execute on an electronic device associated with the agreement performer, or shared or indirectly related devices such as router 501, or a cable set top box, electronic game apparatus for example which may be include or be part of or utilize any type of game controller and/or game console, music player, and any other type of electronic devices, which are not shown for brevity, or any other computational component coupled with the system or any combination thereof so long as the information monitor and information throttle may limit monitored information associated with the agreement performer based on compliance with an agreement, or external condition for example. In one or more embodiments, the information monitor is configured to interface with a proxy server or web filtering software or any other content filtering component 502, to enable existing hardware or software content filtering solutions to throttle monitored information based on compliance by an agreement performer, in addition to their inherent content filtering. At least one embodiment of the system may utilize an electronic device such as a telephone, a computer such as a laptop, tablet, smart phone, or a music player, a game controller, or a television, or associated set top box, or any other device such as a network interfaced device or any information input or output device, or any combination thereof. In one or more embodiments, any electronic device on a local area network may communicate with any other electronic device on the local area network to coordinate or in any other manner communicate information regarding monitoring and enforcement, for example using mDNS.

As shown, a hardware, software or firmware embodiment of information monitor 131*a* may be utilized in router 501 which may interface with information throttle 130*a* directly or indirectly, which itself may be implemented in hardware, software or firmware. Likewise, information monitors 131*b* shown respectively on smart phone 110*a* and computer 110*b* may be implemented as software "apps" or part of an "app", service or in any combination of hardware or firmware. As smart phone 110*a* includes a telephonic interface as well as wireless interface, the usage of the telephone and browser and/or any applications that execute on the smart phone may be obtained by loading the app on the phone and executing the app. The app may hook into the operating system and not only obtain usage associated with the other applications and interfaces, but also with other components on the smart phone including the location and orientation interfaces to determine if the location is changing with respect to time to derive velocity. In addition, existing apps on the smart phone may be interfaced with in order to limit the apps wherein the apps may be locked or set to execute at a lower priority based on the action implemented by the information throttle. In addition, images may be taken from the screen for use in determining if the owner of the smart phone is attempting to bypass text or chat restrictions using a browser-based proxy. Images from the camera on the smart phone may be taken from the forward or rear-pointing camera if so equipped to ensure that the person using the smart phone is agreement performer. Image processing may be performed to determine if the face in a captured image matches the face of the agreement performer and send a notification if this is not the case. In the hardware embodiment shown in FIG. 5, the smart phone and the computer are wirelessly communicating with router 501 that in turn also implements an information monitor and information throttle, 131*a* and 130*a* respectively. The information monitors may monitor different information in a harmonized manner in order to minimize processing on each device. For example, the smart phone information monitor may monitor app specific usage while the router information monitor may monitor web URLs being viewed on the smart phone or may be utilized to detect known open proxy server addresses for an attempt to bypass the system. The information throttle on the smart phone may be capable of interjecting CPU cycles based on an action to slow the device or degrade performance while the information throttle on the router may add delays for the particular user with limits and allow other users of the router to pass on a priority basis or unhindered. The information throttles may also communicate over router 501 to the agreement server or the agreement monitor may run locally on any of the three devices depicted. Due to the ubiquitous nature of television and media websites with videos, television channels or programs that are available on television for example via a television tuner, satellite tuner, or cable set top box tuner, which may be also available on a smart phone via a cable company application may be limited in a synchronized manner so that the set top box and the smart phone allow only a particular amount of time to be watched with respect to a particular channel or television show so that a child cannot bypass the restrictions through use of multiple devices. In the architecture shown, if an agreement performer is able to bypass one information monitor or information throttle, then another information monitor and information throttle in the information pipeline enables the system to perform in a more robust manner. Embodiments that throttle electronic devices associated with apparatus such as vehicles for example may include software components that execute in one or more of the vehicles computers, or which interface to one or more information bus and send vehicle control messages on the bus, such as a CAN or Controller Area Network bus, or LIN or Local Interconnect Network bus, for example that interfaces with an On-Board Diagnostics connector, which has been required in all cars sold in the U.S. since 1996 as one skilled in the art will appreciate. This enables setting of acceleration or other parameters such as timing or maximum fuel injection that may be utilized to indirectly set maximum velocity or acceleration. In addition, one or more embodiments may interface or control a D2B or domestic digital bus high speed multimedia interface or any other communication interface in a vehicle to throttle sound or video for example.

In one or more embodiments, monitored information includes telephone time usage, a number of telephone calls, a telephone number, a number of text messages, a location of the electronic device, a speed of the electronic device, a website address, a computer application that is running or has run or attempted to run, a game, a television channel, a television program, a video, an image captured from the electronic device, an image captured from a camera coupled with the electronic device, a speed and location of the electronic device. Embodiments of the invention may implement an action configured to limit the monitored information to limit input to, output from or data exchange with the electronic device. Other actions may transfer money, send notifications to other parties, etc. Alternatively or in combination an action may be configured to limit the monitored information in a manner for example that degrade performances on the electronic device as previously mentioned. This may be implemented as processing cycles or time delays that may be inserted between accepting input or displaying information or transferring information to or from the electronic device.

In one or more embodiments, the action may be performed across two or more electronic devices associated with the agreement performer, for example a telephone, a computer, a music player, a game or a television, or any other information input or output device, or any combination thereof. In this embodiment, the agreement monitor is configured to sum the monitored information from each respective information monitor into a combined monitored information total and the information throttle is configured to limit the monitored information on each of the two or more electronic devices based on the combined monitored information total. This for example can be utilized to limit total time spent by a child online, watching television, playing electronic games, texting and talking on the phone, so that the child for example may do any of these activities so long as the time spent doing all of the activities is less than a particular threshold, after which for example a degraded performance may be employed on one or more of the electronic devices if desired. Although this example relates to time, it may also relate to any monitored information. For example, limiting a child to 1 hour web browsing across all electronic devices such as a cell phone, tablet computer and laptop computer is accomplished by adding the usage from all monitored devices and throttling all devices when the limit is reached. This sophisticated throttling of information is unknown in the art with respect to agreement compliance and known content filters and makes the agreement monitor the enforcer, not the parent.

Figure 8:
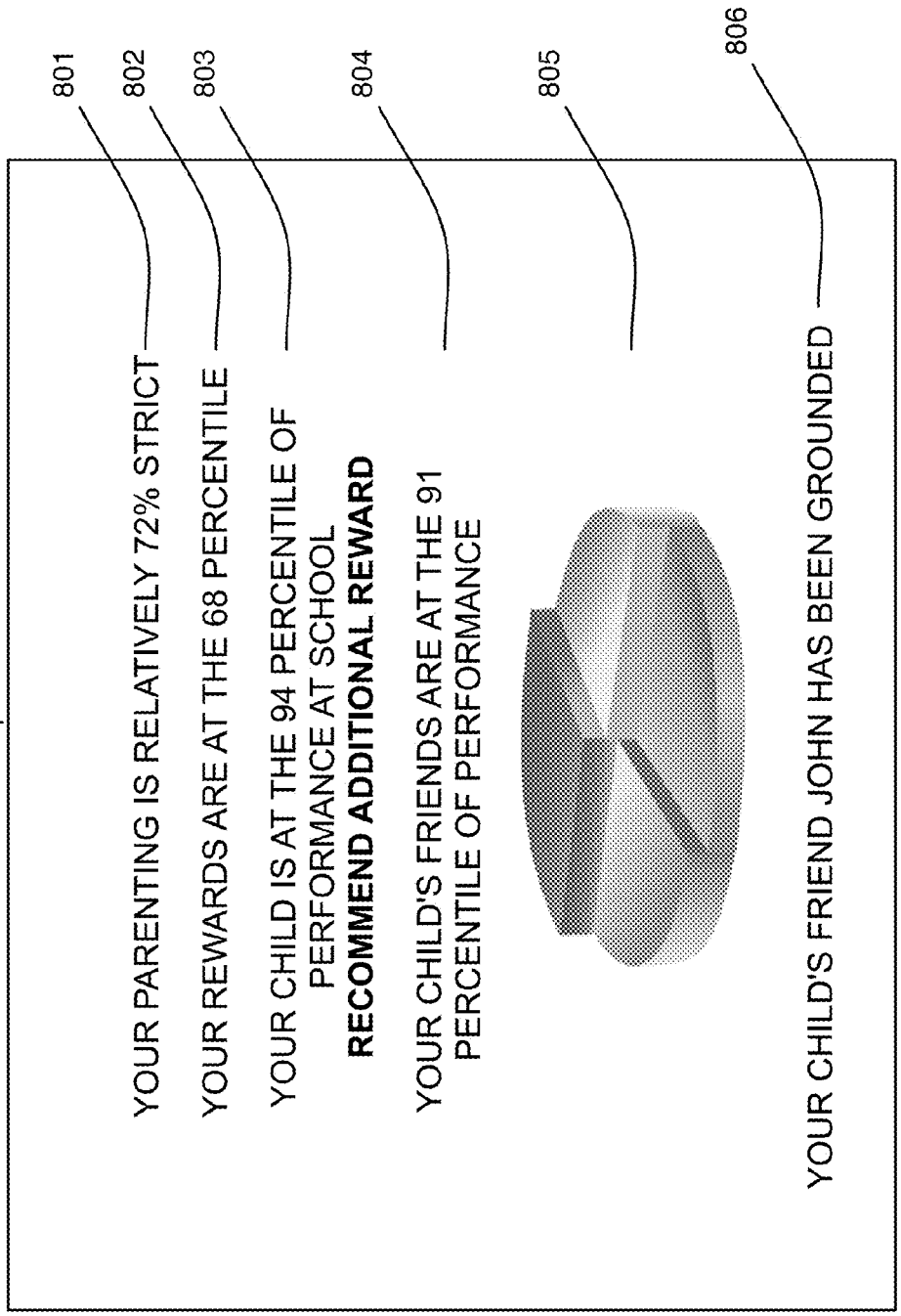
FIG. 8 illustrates an interface for an agreement creator, such as a parent, showing information that has been data mined relative to other parents, children, relative or absolute performance status of activities, actions such as rewards, or recommended rewards, graphical information depicting any combination of information and any warnings.

FIG. 8 illustrates an interface for an agreement creator, such as a parent, showing information that has been data mined relative to other parents, children, relative or absolute performance status of activities, actions such as rewards, or recommended rewards, graphical information depicting any combination of information and any warnings. At least one embodiment of the information throttle is configured to notify the agreement creator based on the compliance. This can be in the form of an email, text message, web page, voice message, or any other type of communication and may include a display such as a visual or audio display of information related to the compliance. As shown, the agreement creator may be notified in a visual display 810 showing relative strictness 801 of an agreement creator based on the level of reprimands or threshold for conditions required for compliance, or in any other manner. Audio or text based notifications are also in keeping with the spirit of the invention. For example, the agreement creator may be notified as to the relative level of rewards given for condition compliance at 802. Overall status of an agreement performer may be shown at 803 along with suggestions or recommendations based on any quantity including performance. In addition, the friends associated with a child, for example if a table of friends 174 in FIG. 2 is implemented with respect to agreement performers, i.e., an additional table is added to the system with a primary key of agreement performer with an additional field of another agreement performer, i.e., friend. In this embodiment, then the friend's performance may also be shown at 804. See also the description of FIG. 2 that details optional friend related information. This information may be utilized by a group of parents or employers to throttle electronic devices or associated information based on the activities and performance related thereto by the group. Any quantity or relationship of any of the data or any other data in the system may be shown with graphical interface 805. For example a map of available drivers may be displayed showing where vetted drivers for adolescent are available, for example if a child is stranded and needs a ride or is intoxicated. Warning information may be shown at 806 to warn an agreement creator of potential issues, so that corrective action can take place before problems occur instead of after problems occur. In addition, the agreement monitor may be configured to display information to the agreement creator or other party related to an attempt to bypass the action configured to limit the monitored information by the agreement performer.

Figure 9:
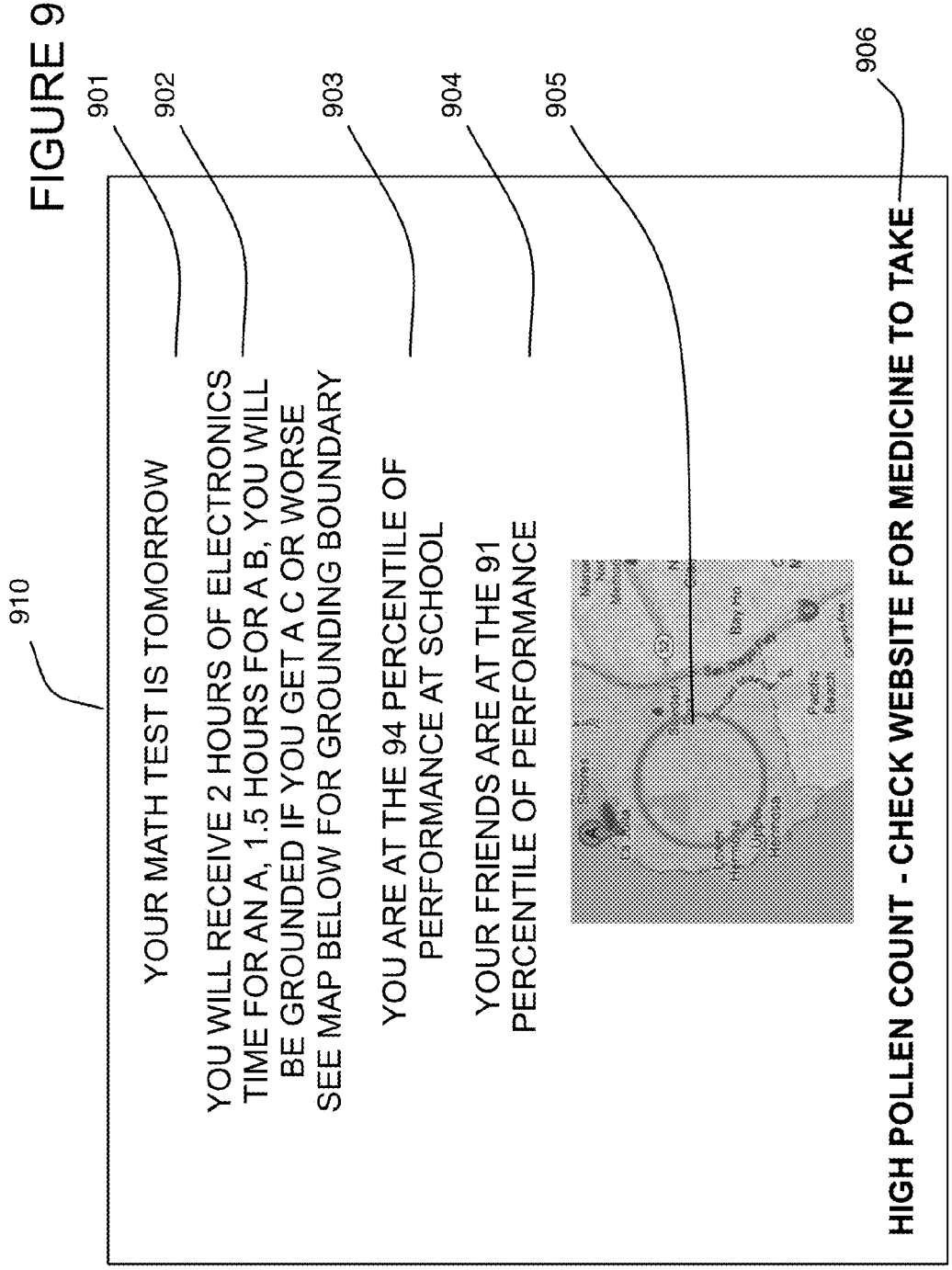
FIG. 9 illustrates an interface for an agreement performer, such as a child, showing upcoming deadlines or events, along with any actions such as rewards or reprimands, activity status, along with activity status that has been data mined with respect to a group of children that are the child's friends, graphical information for example a map which shows a boundary of grounding if a particular activity status is not achieved for a test for example, along with any medical or other warnings.

Alternatively or in combination, the agreement monitor is configured to display information related to the compliance and the monitored information. FIG. 9 illustrates an interface for an agreement performer, such as a child, showing upcoming deadlines or events 901, along with any actions such as rewards or reprimands at 902, activity status at 903, along with activity status that has been data mined with respect to a group of children that are the child's friends at 904, graphical information for example a map which shows a boundary of grounding at 905 if a particular activity status is not achieved for a test for example, along with any medical or other warnings at 906. Any other integrated information including medical records and/or financial may be utilized in combination with embodiments of the invention as part of a total platform to aid and/or for managing an agreement performer such as a child. In one or more embodiments of the invention, the information displayed in FIGS. 8-9, or any subset thereof may be played in audio format or any other format for example to an agreement creator and/or agreement performer. The agreement creator in one or more embodiments of the invention may view any or all portions of the notifications or status for any related agreement performer.

The agreement monitor is generally configured to accept input from the agreement creator to define the condition and the action. Any type of interface including text fields or pull-down lists may be utilized to enter data as is known in the art. Predefined agreements and/or conditions may be provided for default behavior. For example, a default of 1 hour per day of electronic usage from combined devices until all school related activities are complete wherein an addition 1 hour may be rewarded, may be a default for example. Any other type of default actions and/or conditions may be utilized in keeping with the spirit of the invention.

In addition, the notification system may be utilized to enable schools to determine if a child is behaving according to agreements at home, while the system enables a parent to determine if the child is behaving according to agreements at school. Such a system enables problems to be addressed earlier and corrective action to be taken by the system instead of making the parent or the teacher the "bad guy".

Figure 11:
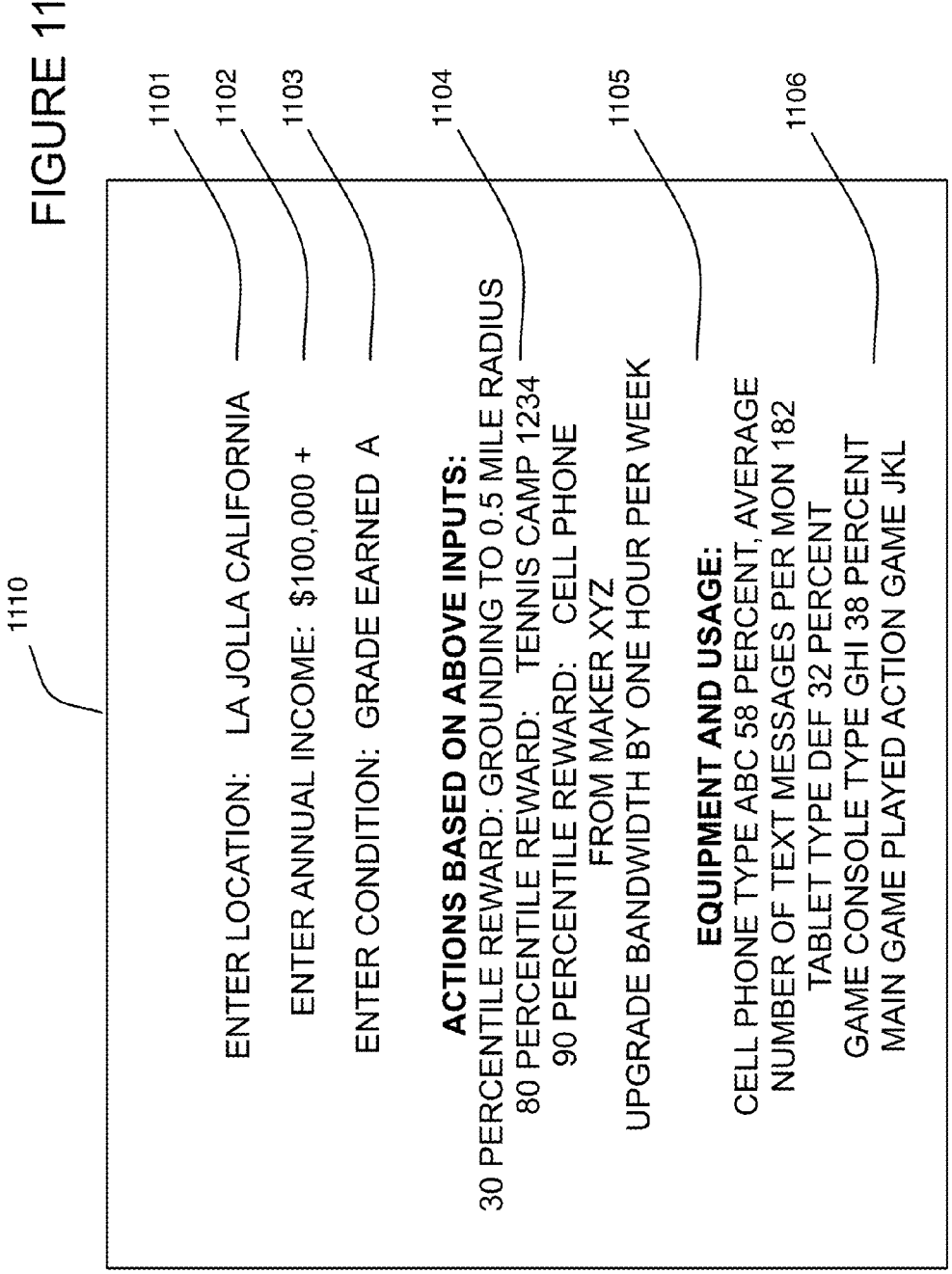
FIG. 11 illustrates a data mining interface to find actions, activities, products, equipment, usage or any combination thereof based on a query of information in the system related to data associated with any item of information in the system.

FIG. 11 illustrates a data mining interface 1110 for example that may execute on agreement server 160 or any computer that may communicate with the system shown in FIG. 1 to enter data queries 1101, 1102 and 1103 or any different or other data or types of data to find actions 1104, activities, products, equipment/usage 1105/1106, or any combination thereof based on a query of information in the system related to data associated with any item of information in the system. Agreement server 160 or any other component in the system may be utilized to charge for the data mining activities and accept payment or send payment to any financial entity that may couple with Internet 150 in FIG. 1 for example. For example, data mining of the information may be performed on any information in the system for example to extract patterns or any other type of information from the various data in the system. Embodiments of the invention may also be configured to enable manufacturers to data mine for types of rewards or incentives and target a group of parents or persons that may buy certain types of products, for example based on agreements and conditions. This also enables manufacturers to target parents of friends of a child that just won a particular reward for achieving a condition for example. For example, any entity may utilize the system to data mine for types of rewards that may be utilized for a reward that is similar to a reward for a condition that another parent or person has utilized, for example with respect to a particular condition, e.g., a reward for an "A" on a final exam. In one or more embodiments, access to agreement database 170 or activity databases 180*a-c* may be provided for example via website 140*b* or agreement server 160 for example. As shown in FIGS. 1-3, access to large numbers of agreement performers enables data mining of patterns that are associated with agreements, conditions, actions, equipment and usage. In addition, data mining may be performed using any personal data associated with agreement creators and agreement performers. In one or more embodiments, net asset or annual income of an agreement performer may be utilized to find patterns of rewards that are given based on compliance with agreements to enable manufacturers to target particular agreement creators, for example market particular products to particular parents that have children in an age group where a type of reward may have been given before. This type of direct marketing has a higher chance of success when patterns indicate that a particular parent may benefit from purchasing a reward for a child when activity status would indicate that a child is highly motivated to achieve satisfy an agreement when the product is available as a reward.

Embodiments of the invention also enable parents or other persons to remain up to date on items popular amongst children that are based on agreements that other parents have entered and which have resulted in rewards for meeting conditions of the agreements. This allows parents to receive product literature, overviews, pictures, movies, blogs or other information to keep a parent "hip". Embodiments of the invention may display or notify an agreement creator and/or agreement performer of potential rewards, using any apparatus that may couple with any portion of the system shown in FIG. 1 for example.

Embodiments of the invention may be configured to display potential rewards on an electronic device being utilized by a person, for example based on bandwidth usage based on information monitoring with respect to a condition of an agreement, to provide further incentive to perform a task for example. Alternatively or in combination, embodiments of the invention may also provide popups or text messages or audio messages during video, music or game play listing tasks to be completed according to agreements. This capability allows a child to sense a potential reward for studying, for example while playing a game, wherein the child may make a decision to go study or simply to remind the child that a test is coming up or that homework is due.

Figure 10:
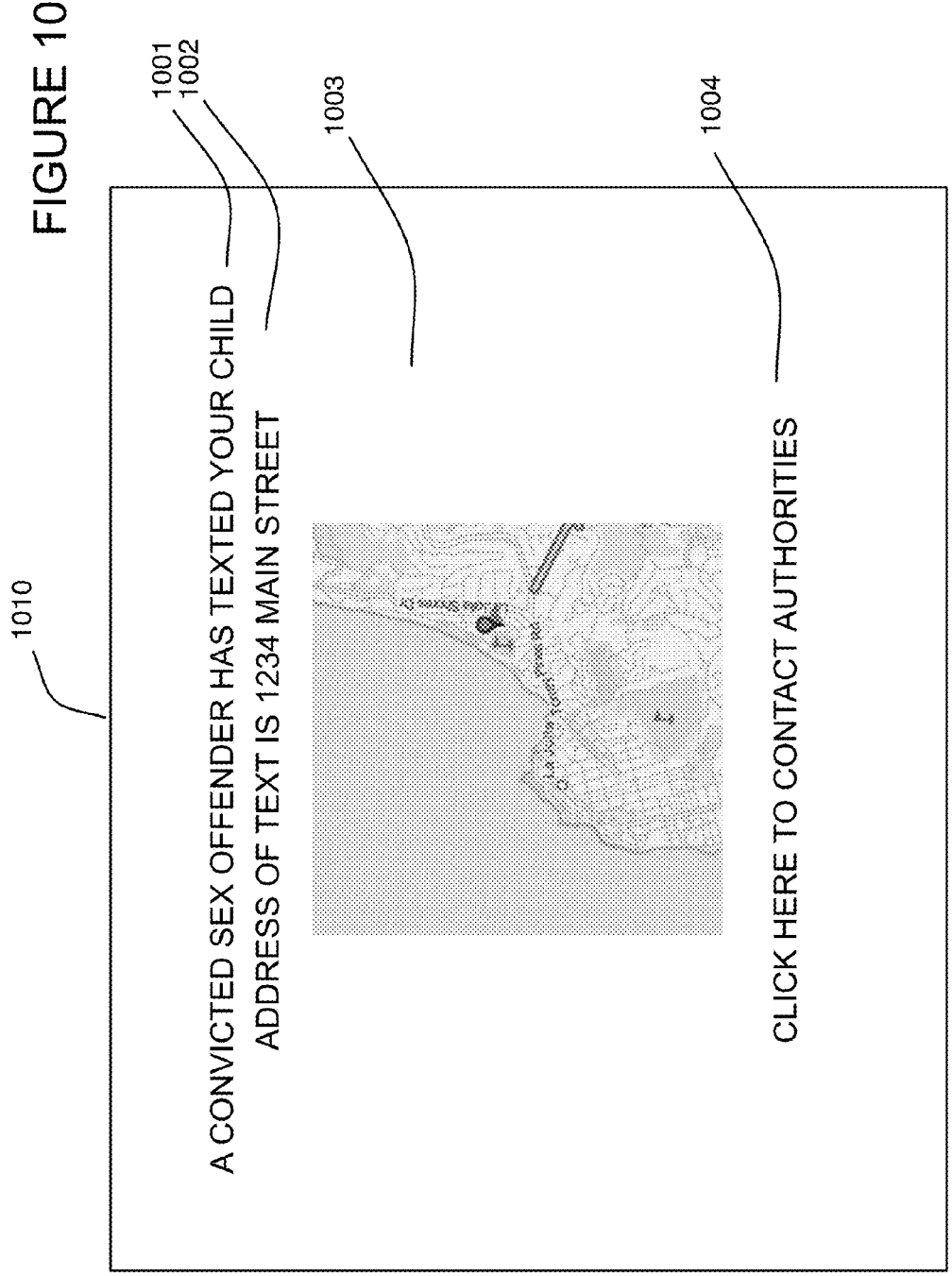
FIG. 10 illustrates a notification to an agreement creator and/or performer indicating that contact from a sex offender or other unwanted contact has been received along with an interface for contacting law enforcement.

FIG. 10 illustrates a notification 1010 to an agreement creator and/or performer indicating that contact from a sex offender or other unwanted contact has been received at 1001 along with an interface for contacting law enforcement. Embodiments of the system may plot the location of the sex offender based on or using sex offender addresses 1002 and/or maps 1003 and IP tracing, and alert authorities at 1004 and potentially throttle other forms of electronic device utilization to further protect a child. Other map-based displays may be utilized to show potential rides for children when they are stranded as has been discussed.

Embodiments of the invention may also alert a parent when a child's friends have gotten in trouble or are not meeting their agreements, so that a parent may limit a child's interactions with particular people or groups. Embodiments may be utilized in a one-person configuration to throttle usage based on addictive behavior such as online gambling or obsessive pornography viewing. Embodiments of the system may also allow for information in the system to be data mined, wherein an agreement database having multiple parents and children is mined to determine whether a parent is strict or not strict, or to rate how strict a parent is being with respect to other parents, agreements and conditions, or in any other manner rate what kind of parent a parent is based on how a child is performing and the rewards that a child is receiving for example. Embodiments of the invention may also provide tips or recommendations based on parent and/or child behavior with respect to agreements, for example as data mined to achieve better performance by the child. The system may provide a suggested type of action to take based on levels of performance of conditions by a child for example. The system enables grouping of multiple students and this may be utilized by schools for their mining purposes as well as to provide parents with control over who a child congregates with and which sets of kids are good or undesirable as friends. Then, a parent may choose to allow a child to perform activities with a certain group of children, e.g., the smart children (for example with the highest grades in the group of children), or the ones that are the hardest working (satisfy the most conditions), etc. Any electronic device in the system may be utilized to display or otherwise present status, notifications, tips or suggestions. Data mining may also be performed to detect attention deficit disorder (ADD) or any other medical condition, for example by mining for patterns in monitored information, such as reaction time in games, grades and derivatives of grades to determine if a child is improving or getting worse for example with respect to certain medications. Data mining may be utilized to suggest alternative courses of treatment that increase or decrease the throttled information or enable or disable particular forms of communication, channels, apps or games, etc., to improve an agreement performer or the performance of an agreement performer, for example with our without data mining information related to medical information.

Figure 12:
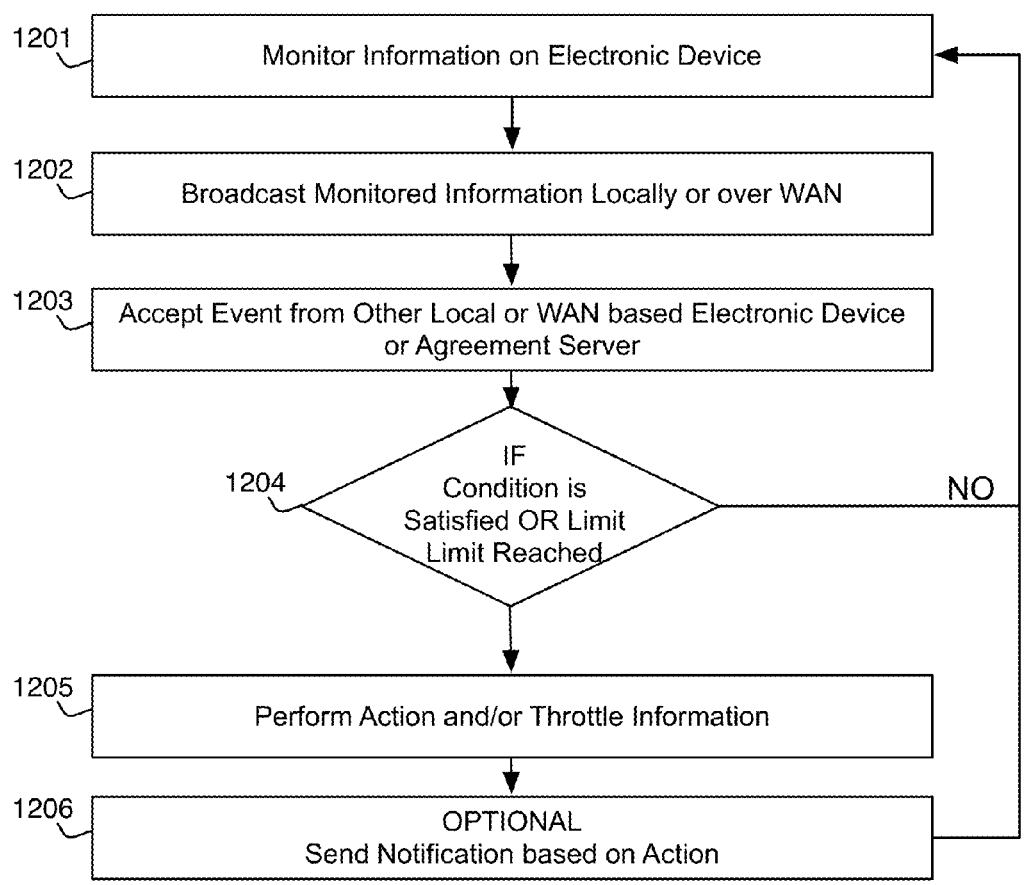
FIG. 12 illustrates a flow chart for the information monitors of FIG. 1.

FIG. 12 illustrates a flow chart for the information monitors of FIG. 1. As shown, information is monitored at 1201 on each electronic device associated with an agreement performer. The monitored information is broadcast to the agreement server and/or the other electronic devices associated with the agreement performer at 1202. Any incoming events are received at 1203 by each electronic device, for example when activity status changes, i.e., some task has been performed by the agreement performer, or an external task has occurred, such as the agreement performer earned enough money from chores to pay for their cell phone. If a condition has been satisfied, e.g., associated with an activity or event as determined on the agreement server or locally on the electronic device at 1204, then an action or throttle is performed at 1205. If the condition or limit has not been satisfied or reached respectively, then processing continues at 1201. If the action or throttle is performed at 1205, then optionally a notification may be sent to the agreement creator or anyone else including the agreement performer that the action or throttle has taken place at 1206.

Figure 13:
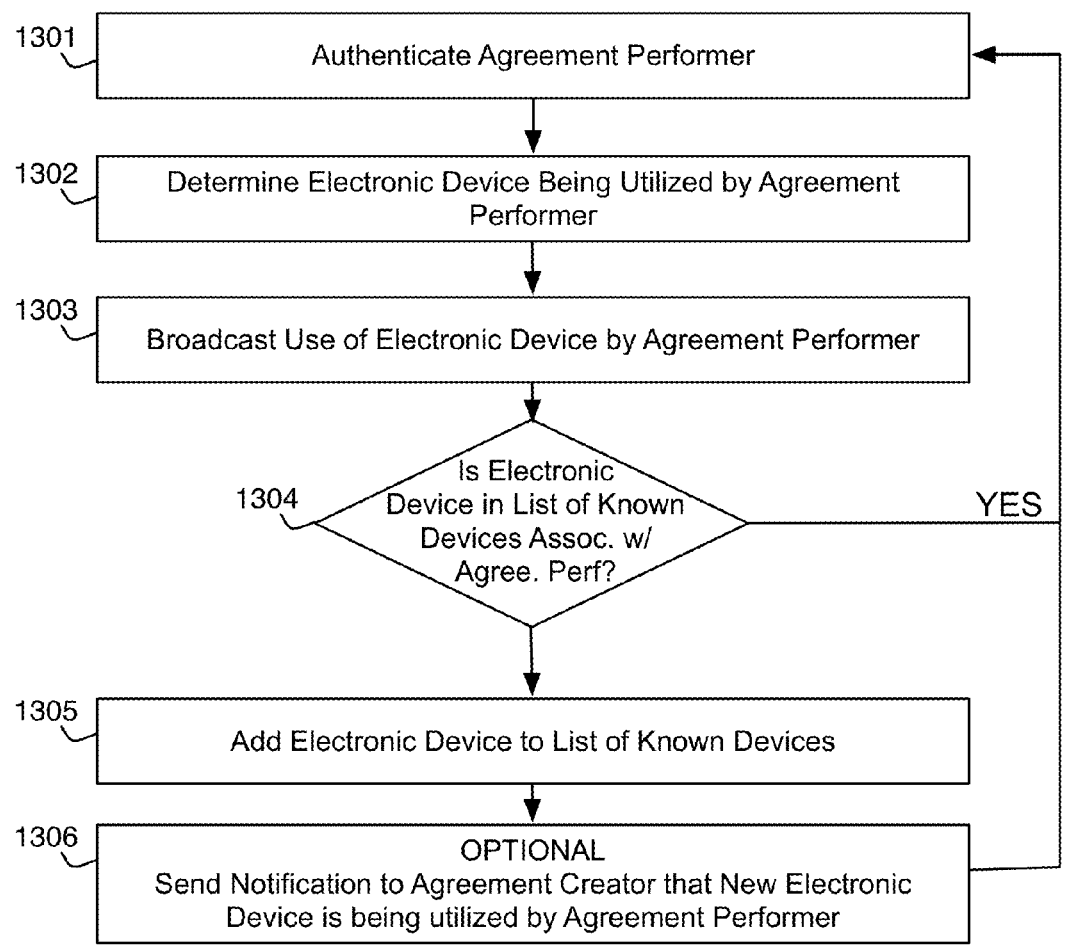
FIG. 13 illustrates a flow chart for the ensuring information that is monitored is associated with the correct agreement performer.

FIG. 13 illustrates a flow chart for the ensuring information that is monitored is associated with the correct agreement performer. Each electronic device, or application or service thereon that is capable of authenticating an agreement performer does so at 1301. The identity of the electronic device, i.e., computer name, cell phone number, IP address of game controller, etc., is obtained at 1302. The identity of the device is broadcast at 1303 to the agreement server or local electronic devices along with the identity of the agreement performer using the device. If the electronic device is unknown to the system, which may indicate that a child is attempting to bypass the system by using someone else's computer, then the electronic device identifier may be stored as a new entry in table 172 of FIG. 2 for example, and an optional notification of the new device may be sent to the agreement creator, e.g., to alert them of any attempt to bypass the system. Authentication may utilize any known mechanism to determine who is utilizing the system, including hooks into social media websites when a user logins in for example, wherein the social media site may make usage calls to embodiments of the agreement server for example, i.e., act as an information monitor and alert the agreement server and/or any information throttles of the usage.

Figure 14:
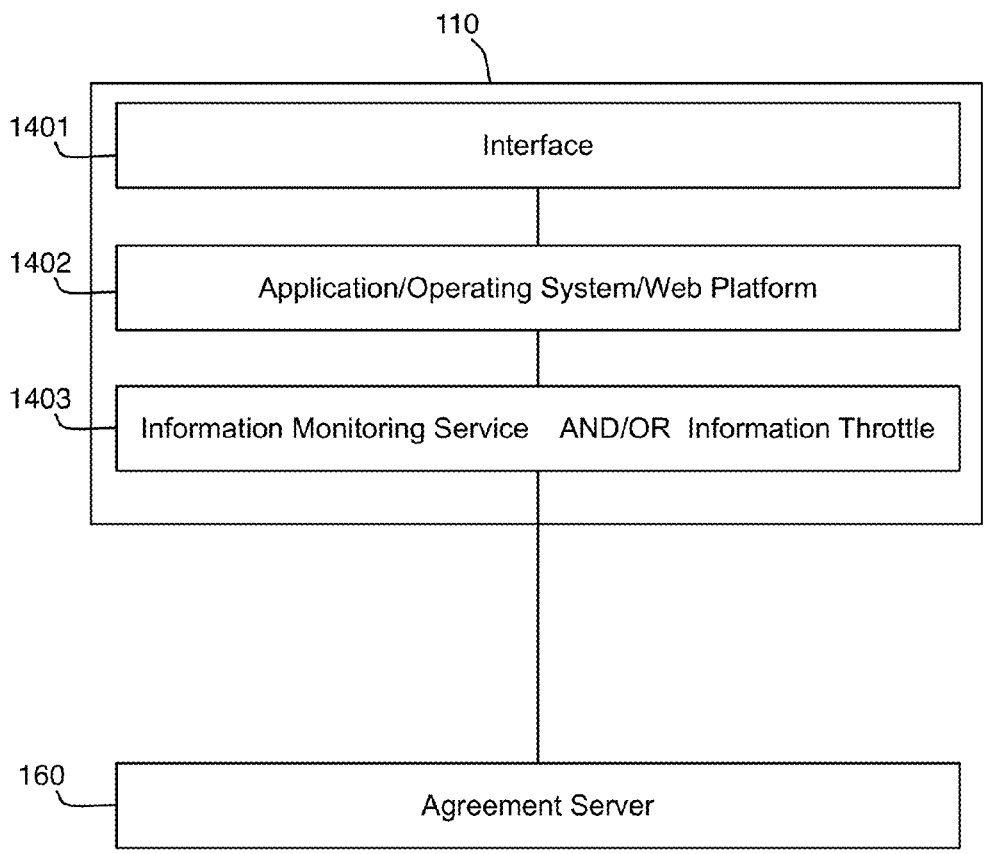
FIG. 14 illustrates a high level architecture for information monitors and information throttles and their relation to the electronic device and agreement server.

FIG. 14 illustrates a high level architecture for information monitors and information throttles and their relation to the electronic device and agreement server. Any electronic device 110 with an interface 1401, whether wireless or wired communication interface, that may be throttled by one or more embodiments of the system. The application may be a standard executable, which executes on an operating system or web platform as script or code in a remote server for example. Embodiments of the information monitor hook into the application or operating system or web platform and monitor inputs and potentially throttle information at 1403. For example as previously discussed, the information monitor may intercept key strokes or other input device events from the operating system and/or device drivers associated with the input devices, or accept events from the application 1402 for example that allows the information monitor to monitor information. The information monitor and information throttle may communicate to local electronic devices or to an agreement server 160 as shown. Alternatively, the agreement server may be local to electronic device 110 or in any component shown in FIG. 1. The information throttle may limit information exchange or display and/or make calls to the operating system to slow the system, dim the display, introduce delays, set any parameters, or exit the application for example based on the monitored information and any limits stored locally or remotely. Any other architecture that enables an electronic device to monitor and throttle information is in keeping with the spirit of the invention.

While the invention herein disclosed has been described by means of specific embodiments and applications thereof, numerous modifications and variations could be made thereto by those skilled in the art without departing from the scope of the invention set forth in the claims.

What is claimed is:

1. An agreement compliance controlled information throttle comprising:
   an agreement database stored in a memory of a computer wherein said agreement database comprises
      an agreement stored in said memory of said agreement database comprising an agreement creator and an agreement performer wherein said agreement comprises
         a first unique identifier associated with said agreement performer;
         a second unique identifier associated with said agreement creator;
         a condition comprising at least one of
            an activity associated with homework or a test to be performed by said agreement performer;
            an event associated with an environmental event comprising information related to any combination of weather, temperature, allergy, pollen or smog alert;
         an action to be performed based on compliance with said condition;
      wherein said agreement database comprises a first condition having a first activity that is independent of input into at least one electronic device by said agreement performer;
   an activity database comprising activity status associated with said activity of said condition to be satisfied by said agreement performer wherein said activity status comprises a homework completion status associated with said homework or a grade value associated with said test;

an agreement monitor coupled with said agreement database and said activity database and configured to at least one of check if said condition has been satisfied based on said activity status to determine said compliance;

check if said condition has been satisfied based on said event associated with said environmental event comprising said information related to any combination of said weather, temperature, allergy, pollen or smog alert;

an information monitor configured to determine monitored information associated with said at least one electronic device that is associated with said agreement performer;

an information throttle coupled at least intermittently with said agreement monitor and optionally at least intermittently with said information monitor and configured to perform said action, to at least partially increase or at least partially decrease information input, output, used on or exchanged with said at least one electronic device;

wherein said action is based on at least one of
    said activity;
    said event;

wherein said action is configured to direct said information throttle to at least partially increase or decrease a performance of said at least one electronic device through an insertion of at least one time delay between at least one of
        an acceptance of an input of said information;
        a display of said information;
        a transfer of said information to or from said at least one electronic device, such that based on if said condition has been satisfied and during use of said at least one electronic device by said agreement performer;

maintain functionality of said at least one electronic device, and at least one of
        at least partially increase or decrease a speed of functionality of said at least one electronic device and
        at least partially increase or decrease a speed of responsiveness of said at least one electronic device;

wherein said information throttle is configured to perform at least one of if said activity comprising said test grade or said homework completion status is equal to or above a predefined value then said information throttle performs said at least partially increase in said performance;

if said event comprising said weather, temperature, allergy, high pollen count or smog alert event is detected then said information throttle performs said at least partially increase in said performance;

if said activity comprising said test grade or said homework completion status is below said predefined value then said information throttle performs said at least partially decrease in said performance;

if said event comprising said weather, temperature, allergy, high pollen count or smog alert event is not detected then said information throttle performs said at least partially decrease in said performance; and, wherein said at least one electronic device comprises a plurality of electronic devices, and said action is performed across said plurality of electronic devices associated with said agreement performer, comprising a telephone, a computer, a music player, a game or a television or a remote control or an appliance or any combination thereof and wherein said agreement monitor is configured to sum said monitored information from each respective information monitor into a combined monitored information total; and, wherein said information throttle is configured to limit said monitored information on each of said plurality of electronic devices based on said combined monitored information total.

2. The agreement compliance controlled information throttle of claim 1 wherein said information throttle is further configured to perform said action to at least partially increase or at least partially decrease information input, output, used on or exchanged with said at least one electronic device even if no network connection is available between said information throttle and said agreement monitor, such that said information input, output, used on or exchanged with said at least one electronic device is monitored locally and said at least one electronic device is throttled locally without requiring a data transfer to or from said at least one electronic device.

3. The agreement compliance controlled information throttle of claim 1 wherein said action comprises one or more of a time limit that limits an amount of time that said monitored information may be displayed on said at least one electronic device, a numerical limit that limits a number of data entries associated with said monitored information, a web limit that limits access to a website associated with said monitored information, an application limit that limits access to an application associated with said monitored information, a game limit that limits game parameters associated with said monitored information, a television limit that limits a television program or channel associated with said monitored information, a monetary transfer.

4. The agreement compliance controlled information throttle of claim 1 wherein said activity database comprises activities related to compliance with a requirement or corporate compliance or any combination thereof.

5. The agreement compliance controlled information throttle of claim 1 further comprising a server computer wherein said agreement monitor is configured to execute on said server computer and wherein said server computer is configured to be remotely accessed over a computer network.

6. The agreement compliance controlled information throttle of claim 1 wherein said information monitor and said information throttle are configured to execute on said at least one electronic device, or a router, or a cable set top box or any combination thereof.

7. The agreement compliance controlled information throttle of claim 1 wherein said information monitor is configured to interface with a proxy server or web filtering software.

8. The agreement compliance controlled information throttle of claim 1 wherein said monitored information comprises any combination of a telephone time usage, a number of telephone calls, a telephone number, a number of text messages, a website address, a computer application, a game, a television channel, an image captured from said at least one electronic device, an image captured from a camera coupled with said at least one electronic device and which results in said action performed by said information throttle to at least partially increase or at least partially decrease said information input, output, used on or exchanged with said at least one electronic device.

9. The agreement compliance controlled information throttle of claim 1 wherein said action is further configured to direct said information throttle to dim or brighten a display, lower or raise a volume on said at least one electronic device or any combination thereof.

10. The agreement compliance controlled information throttle of claim 1 wherein said information throttle is further configured to notify said agreement creator based on said compliance.

11. The agreement compliance controlled information throttle of claim 1 wherein said agreement monitor is configured to display information to said agreement creator related to an attempt to bypass said action by said agreement performer.

12. The agreement compliance controlled information throttle of claim 1 wherein said monitored information comprises at least a value associated with a speed, an orientation, a distance, an acceleration, or a location of said at least one electronic device and which results in said action performed by said information throttle to at least partially increase or at least partially decrease said information input, output, used on or exchanged with said at least one electronic device.

13. The agreement compliance controlled information throttle of claim 1 wherein said monitored information comprises a location of a second device in communication with said at least one electronic device wherein said location of said second device is correlated against a sex offender map which results in said action that comprises a notification to said agreement creator.

14. The agreement compliance controlled information throttle of claim 1 wherein
   if said agreement performer is grounded and a location of said at least one electronic device is outside a grounded area then said information throttle performs said partially decrease in said performance; and,
   if said agreement performer is grounded and a location of said at least one electronic device is within the grounded area then said information throttle performs said partially increase in said performance.

15. The agreement compliance controlled information throttle of claim 1 wherein
   wherein said information monitor is configured to send a message to at least the agreement performer that indicates that the agreement performer is grounded if the agreement performer is travelling faster than a predefined speed or outside of said grounded area.

16. The agreement compliance controlled information throttle of claim 1 wherein
   wherein said information monitor is configured to send a message to at least the agreement creator that indicates that a friend of the agreement performer is grounded.

17. An agreement compliance controlled information throttle comprising:
   an agreement database stored in a memory of a computer wherein said agreement database comprises
      an agreement stored in said memory of said agreement database comprising an agreement creator and an agreement performer wherein said agreement comprises
         a first unique identifier associated with said agreement performer;
         a second unique identifier associated with said agreement creator;
         a condition comprising at least one of
            an activity associated with homework or a test to be performed by said agreement performer;
            an extracurricular activity or chore to be performed by said agreement performer;
            an event associated with an environmental event comprising information related to any combination of weather, temperature, allergy, pollen or smog alert;
            an action to be performed based on compliance with said condition;
      wherein said agreement database comprises a first condition having a first activity that is independent of input into at least one electronic device by said agreement performer;
   an activity database comprising activity status associated with said activity of said condition to be satisfied by said agreement performer wherein said activity status comprises a homework completion status associated with said homework or a grade value associated with said test;
   a second activity database comprising extracurricular or chore activity status associated with said activity of said condition to be satisfied by said agreement performer;
   an agreement monitor coupled with said agreement database and said activity database and configured to at least one of
      check if said condition has been satisfied based on said activity status to determine said compliance;
      check if said condition has been satisfied based on said extracurricular or chore activity status to determine said compliance;
      check if said condition has been satisfied based on said event associated with said environmental event comprising said information related to any combination of said weather, temperature, allergy, pollen or smog alert;
   an information monitor configured to determine monitored information associated with said at least one electronic device that is associated with said agreement performer;
   an information throttle coupled at least intermittently with said agreement monitor and optionally at least intermittently with said information monitor and configured to perform said action, to at least partially increase or at least partially decrease information input, output, used on or exchanged with said at least one electronic device;
   wherein said action is based on at least one of
      said activity;
      said extracurricular activity or chore;
      said event;
   wherein said action is configured to direct said information throttle to
      at least partially increase or decrease a performance of said at least one electronic device through an insertion of at least one time delay between at least one of
         an acceptance of an input of said information;
         a display of said information;
         a transfer of said information to or from said at least one electronic device, such that based on if said condition has been satisfied and during use of said at least one electronic device by said agreement performer,
      maintain functionality of said at least one electronic device, and
      at least one of
         at least partially increase or decrease a speed of functionality of said at least one electronic device and at least partially increase or decrease a speed of responsiveness of said at least one electronic device;

wherein said information throttle is configured to perform at least one of
- if said activity comprising said test grade or said homework completion status is equal to or above a predefined value then said information throttle performs said at least partially increase in said performance;
- if said activity comprising said extracurricular or chore activity status is equal to or above a predefined value then said information throttle performs said at least partially increase in said performance;
- if said event comprising said weather, temperature, allergy, high pollen count or smog alert event is detected then said information throttle performs said at least partially increase in said performance;
- if said activity comprising said test grade or said homework completion status is below said predefined value then said information throttle performs said at least partially decrease in said performance;
- if said activity comprising said extracurricular or chore activity status is below said predefined value then said information throttle performs said at least partially decrease in said performance;
- if said event comprising said weather, temperature, allergy, high pollen count or smog alert event is not detected then said information throttle performs said at least partially decrease in said performance; and, wherein said at least one electronic device comprises a plurality of electronic devices, and said action is performed across said plurality of electronic devices associated with said agreement performer, comprising a telephone, a computer, a music player, a game or a television or a remote control or an appliance or any combination thereof and wherein said agreement monitor is configured to sum said monitored information from each respective information monitor into a combined monitored information total; and, wherein said information throttle is configured to limit said monitored information on each of said plurality of electronic devices based on said combined monitored information total.

* * * * *